(12) United States Patent
Bontu et al.

(10) Patent No.: US 9,503,935 B2
(45) Date of Patent: Nov. 22, 2016

(54) HANDOVER MECHANISM IN CELLULAR NETWORKS

(71) Applicant: BlackBerry Limited, Waterloo (CA)

(72) Inventors: Chandra Sekhar Bontu, Nepean (CA); Yi Song, Plano, TX (US); Zhijun Cai, Euless, TX (US); Shalini Suresh Periyalwar, Waterloo (CA)

(73) Assignee: BlackBerry Limited, Waterloo, Ontario ( * ) Notice: Subject to any disclaimer, the term of this patent is extended or adjusted under 35 U.S.C. 154(b) by 423 days.

(21) Appl. No.: 13/752,054

(22) Filed: Jan. 28, 2013

(65) Prior Publication Data

US 2014/0211762 A1    Jul. 31, 2014

(51) Int. Cl.
*H04W 36/00*     (2009.01)
*H04W 36/38*     (2009.01)
*H04L 12/917*    (2013.01)
*H04W 36/30*     (2009.01)
*H04W 84/04*     (2009.01)

(52) U.S. Cl.
CPC .......... *H04W 36/0016* (2013.01); *H04L 47/76* (2013.01); *H04W 36/0061* (2013.01); *H04W 36/30* (2013.01); *H04W 36/38* (2013.01); *H04W 84/045* (2013.01)

(58) Field of Classification Search
CPC ... H04W 36/18; H04W 36/30; H04W 36/38; H04W 36/0016; H04W 36/0061
See application file for complete search history.

(56) References Cited

U.S. PATENT DOCUMENTS

| 2007/0081492 | A1 | 4/2007 | Petrovic |
| 2008/0188223 | A1 | 8/2008 | Vesterinen et al. |
| 2008/0233963 | A1 | 9/2008 | Alanara et al. |
| 2009/0046573 | A1* | 2/2009 | Damnjanovic ....... H04W 36/30 370/216 |
| 2009/0111476 | A1 | 4/2009 | Hamalainen |
| 2010/0027497 | A1 | 2/2010 | Pelletier |
| 2012/0002643 | A1 | 1/2012 | Chung et al. |
| 2012/0039299 | A1 | 2/2012 | Teyeb et al. |
| 2012/0039302 | A1 | 2/2012 | Chun et al. |

(Continued)

FOREIGN PATENT DOCUMENTS

| EP | 2309795 | 4/2011 |
| EP | 2343919 | 7/2011 |

(Continued)

OTHER PUBLICATIONS

3GPP TS 36.300 V10.5.0 (Nov. 2011) Technical Specification: Evolved Universal Terrestrial Radio Access (E-UTRA) and Evolved Universal Terrestrial Radio Access Network (E-UTRAN); Overall description; Stage 2 (Release 10).

(Continued)

*Primary Examiner* — Omer S Mian
(74) *Attorney, Agent, or Firm* — Fish & Richardson P.C.

(57) ABSTRACT

Systems, apparatuses, and methods for a handover procedure in heterogeneous networks are provided. In particular, an intermediate handover (IHO) is introduced. Certain aspects of the disclosure involve, a method, performed at a serving base station of a wireless communications network, where the serving base station serves a user equipment (UE). The method includes receiving a downlink (DL) signal quality indicator from the UE; and determining, from the signal quality indicator, whether a condition for an intermediate handover (IHO) state is satisfied. If the condition for the intermediate handover state is satisfied, the serving base station can initiate the intermediate handover state.

32 Claims, 14 Drawing Sheets

(56) References Cited

U.S. PATENT DOCUMENTS

| | | |
|---|---|---|
| 2012/0057474 A1* | 3/2012 | Hirano et al. ............... 370/248 |
| 2012/0218970 A1 | 8/2012 | Westgerg et al. |
| 2012/0269174 A1* | 10/2012 | Yang et al. ................ 370/332 |
| 2012/0314690 A1 | 12/2012 | Xu et al. |
| 2013/0130688 A1* | 5/2013 | Chin et al. ................ 455/436 |
| 2013/0316712 A1 | 11/2013 | Lee |
| 2014/0023042 A1* | 1/2014 | Westberg ................... 370/331 |
| 2014/0023045 A1* | 1/2014 | Li et al. .................... 370/331 |
| 2014/0050197 A1* | 2/2014 | Legg et al. ................. 370/331 |

FOREIGN PATENT DOCUMENTS

| | | |
|---|---|---|
| EP | 2190241 | 3/2012 |
| WO | 2011/020062 | 2/2011 |
| WO | 2011/156769 | 12/2011 |

OTHER PUBLICATIONS

International Search Report and Written Opinion of the International Searching Authority issued in International Application No. PCT/US2013/023386 on Oct. 16, 2013; 10 pages.

International Search Report and Written Opinion of the International Searching Authority issued in International Application No. PCT/US2013/023497 on Oct. 15, 2013; 13 pages.

Office Action issuedin Canadian Application No. 2899192 on Jul. 13, 2016.

Office Action issued in related Canadian Application No. 2899186 on Sep. 19, 2016.

* cited by examiner

HANDOVER MECHANISM IN CELLULAR NETWORKS

FIELD

This disclosure relates to handover procedures in cellular wireless networks, and more particularly, in heterogeneous networks.

BACKGROUND

Wireless communication systems can include a network of one or more base stations to communicate with one or more user equipment (UE) such as fixed and mobile wireless communication devices, mobile phones, or laptop computers with wireless communication cards. Base stations are spatially distributed to provide radio coverage in a geographic service area that is divided into cells. A UE that is located within a base station's cell of coverage area is generally registered with the base station. The UE and the base station communicate with each other via radio signal. The base station is called the serving base station of the UE and the cell associated with the base station is called the serving cell of the UE.

In some wireless networks, cells of different coverage sizes may be deployed to improve cell coverage or to offload traffic. For example, in an Evolved Universal Terrestrial Radio Access Network (E-UTRAN), small cells (e.g., pico cells, relay cells, or femto cells) may be deployed with overlaid macro cells. A network including large cells (e.g., macro cells) as well as small cells (e.g., pico cells, relay cells, femto cells) may be referred to as a heterogeneous network. A UE in the heterogeneous network may move in a large geographical area which may trigger a handover procedure and result in changing of the UE's serving cells.

BRIEF DESCRIPTION OF DRAWINGS

For a more complete understanding of this disclosure, reference is now made to the following brief description of the drawings, taken in connection with the accompanying drawings and detailed description, wherein like reference numerals represent like parts.

DETAILED DESCRIPTION

Figure 1:
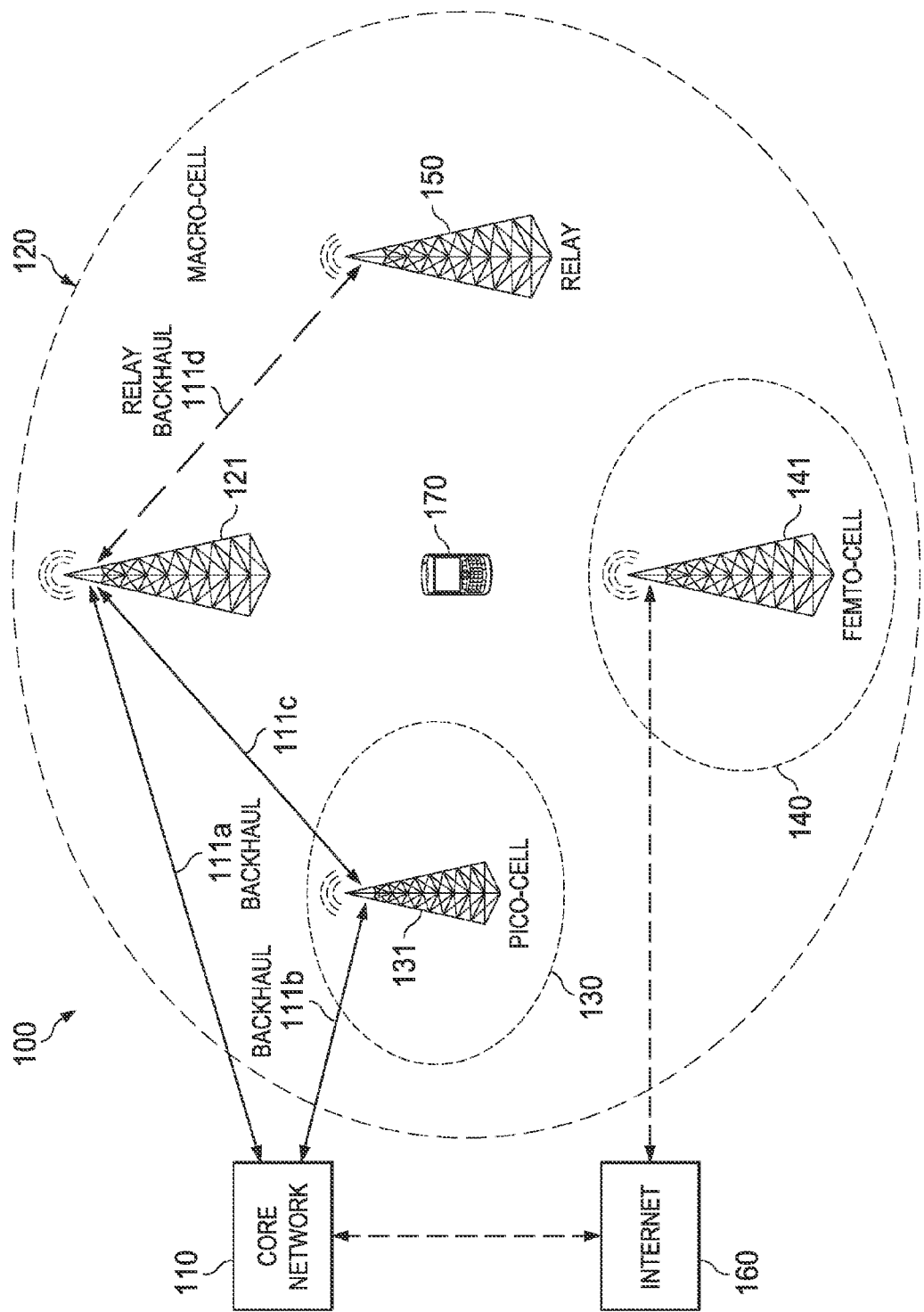
FIG. 1 is a schematic representation of an example heterogeneous wireless communications network.

The present disclosure is directed to systems, methods, and apparatuses for handover in wireless communications networks, especially in heterogeneous wireless communication networks. Heterogeneous networks may include cells of various coverage sizes resulting at least in part from different transmission power levels of base stations, e.g., macro cell, femto cell, pico cell, relay cell, etc. As the UE moves across cell boundaries, a handover procedure may be performed to ensure that the UE is connected or camped on a serving cell with good coverage for the UE.

Since the heterogeneous network may contain various types of cells, there may be overlaps between coverage areas of multiple cells, especially in unplanned clustered cell deployments where a large number of small cells may be situated within a macro cell's coverage area. When a UE traverses between adjacent cells with overlapped coverage area, there might be multiple handovers. The UE may only stay with one cell for a short time before it switches to another cell. Frequently switching a UE among multiple cells may incur significant signalling overhead, delay, data interruptions, and/or quality of service (QoS) degradation.

To improve the QoS, an intermediate handover (IHO) state can be introduced to reduce unnecessary and unwanted handovers. The UE may be in the IHO state before it is handed over to a target cell completely. During the IHO state, the UE can be connected to the serving cell as well as one or more neighbouring cells. The neighbouring cells that are connected to the UE during the IHO state are referred to as IHO candidate cells. One cell that actively transmits data to the UE is referred to as the Anchor cell. The IHO state can be transparent to the core network. Therefore, the IHO state can also be referred to as a network agnostic mobility management (NA-MM) state.

To enable the IHO state, a method can be performed at a serving base station of a UE in a wireless communications network. The method includes receiving a downlink (DL) signal quality indicator from the UE; determining, from the signal quality indicator, whether a condition for an intermediate handover (IHO) state is satisfied; and if the condition for the IHO state is satisfied, initiating the IHO state. Specifically, the signal quality indicator can indicate that UE is proximate to a neighbouring base station and can receive data packets from the neighbouring base station.

In addition, a method can be performed at an IHO candidate base station in the wireless communications network. The method includes receiving an indication from the serving base station that an IHO state has been initialized; receiving an indication from the serving base station that the IHO candidate base station has anchor functionality for the UE; and determining whether to inform the serving base station to handover the UE to the target base station.

Furthermore, a method can be performed at the UE in the wireless communications network. The method includes sending a receive signal quality report of the serving base station and one or more neighbouring base stations; and receiving a message from the serving base station initiating the IHO state.

During the IHO state, the UE can transition to a HO state where the UE is handed over to a target cell, or to a STAY state where the UE stays with the serving cell. Conditions for the IHO, HO, and STAY states can be defined based on the signal quality indicator. If the condition for the HO state or the STAY state is satisfied, corresponding state transition from the IHO state can be initiated by the serving base station or the UE.

Certain aspects of the method performed at a serving base station of a wireless communications network, the serving base station serving a user equipment (UE). The method may include receiving a downlink (DL) signal quality indicator from the UE, the signal quality indicator indicating that UE is proximate to a neighboring base station and can receive data packets from the neighboring base station. It can be determined, from the signal quality indicator, whether a condition for an intermediate handover (IHO) state is satisfied. Responsive to the determining, the intermediate handover state can be initiated.

Certain aspects are directed to a base station of a wireless communications network, the base station serving a user equipment (UE), the base station may be configured to receive a downlink (DL) signal quality indicator from the UE, the signal quality indicator indicating that UE is proximate to a neighboring base station and can receive data packets from the neighboring base station. The base station can determine, from the signal quality indicator, whether a condition for an intermediate handover (IHO) state is satisfied. Responsive to the determination that the condition for the intermediate handover state is satisfied, the base station can initiate the intermediate handover state.

Certain aspects of the disclosure are directed to systems, apparatuses, and methods performed at a IHO candidate base station of a wireless communications network, the wireless communications network comprising a serving base station serving a user equipment (UE), the UE in communication with the serving base station and the IHO candidate base station. An indication can be received from the serving base station that a IHO state has been initialized. An indication can be received from the serving base station that the IHO candidate base station has anchor functionality for the UE. It can be determined whether to inform the serving base station to handover the UE to a target base station.

Certain aspects of the implementations are directed systems, apparatuses, and methods performed at a user equipment (UE), the UE served by a base station of a wireless communications network. A measurement report may be sent to the serving base station. A message may be received from the serving base station initiating an IHO state. The UE may operate in the IHO state with the serving base station and at least one neighbor base station.

In certain implementations, the receive signal quality comprised at least one of the following: reference signal receive quality, reference signal receive power, signal to interference plus noise ratio, or average packet delay.

In certain implementations, the signal quality indicator indicates that the UE is proximate to a plurality of neighboring base stations and can receive data packets from at least a subset of the plurality of neighboring base stations.

Certain aspects of the implementations may include selecting one or more neighboring base station from a plurality of neighboring base stations when the DL signal quality indicator received from the UE is above a predefined threshold, sending an IHO request message to the one or more neighboring base stations, receiving an IHO response from the one or more neighboring base stations, and evaluating the IHO response to determine the IHO candidate base stations.

In certain implementations, the predefined threshold is a UE specific parameter and selected to satisfy the promised Quality of Service (QoS) to the UE.

In certain implementations, evaluating the IHO responses may include selecting a neighboring base station as a potential IHO candidate base station when the neighboring base station responds positively to the IHO request, choosing the IHO candidate base stations when the number of potential IHO candidate base stations is above a maximum number, N, of allowed IHO candidate base stations, and sending IHO cancellation messages to the neighboring base stations which accepted the IHO request but are not included in the subset of IHO candidate base stations.

In certain implementations, choosing the IHO candidate base stations may include ordering the IHO candidate base stations in decreasing order signal quality indicator and selecting the IHO candidate base stations starting from the first in the order list and up to the maximum allowed IHO candidate base stations.

In certain implementations, the maximum number of IHO candidate base stations, N, is a network configuration dependent parameter.

In certain implementations, choosing the IHO candidate base stations comprises selecting N base stations having a highest signal quality indicator.

Certain aspects of the implementations may also include starting an IHO timer, sending an IHO initiation message to the UE initiating an IHO state, and transmitting data to the UE.

In certain implementations, the value of the IHO timer is included in the IHO initiation message to the UE.

In certain implementations, the value of IHO timer is included in the IHO request message to the neighboring base stations.

In certain implementations, the serving base station is a default anchor base station after the IHO state is initiated. The anchor base station in IHO state is configured to assign DL resources and grant UL resources to the UE and send/receive data packets to/from the UE.

In certain aspects, during the IHO state, the implementations may include transferring anchor base station functionality to one of the IHO candidate base stations when the DL signal quality from the IHO candidate base station as indicated in the DL signal quality indicator is better than the DL signal quality from the serving base station.

In certain aspects, during the IHO state, initiating a handover to one of the IHO candidate base stations when the DL signal quality from the IHO candidate base station and from the serving base station meets HO criteria.

In certain implementations, meeting the HO criteria may include that the DL signal quality from the serving base station is inferior to the DL signal quality from the IHO candidate base station by a predefined threshold.

In certain aspects, during the IHO state, the implementations may include initiating a stay state when the DL signal quality, as indicated in the DL signal quality indicator, from all the IHO candidate base stations and serving base station meets criteria for stay state.

In certain implementations, the criteria for stay state may include the DL signal quality from the IHO candidate base station is inferior to the DL signal quality from the serving base station by a predefined threshold.

In certain implementations, during the IHO state, a handover to a non-IHO candidate base station may be initiated when the DL signal quality from the non-IHO candidate base station and serving base station meet HO criteria.

In certain implementations, the HO criteria may also include that the DL signal quality from the serving base station is inferior to the DL signal quality from the non-IHO candidate base station by a predefined threshold.

In certain implementations, the IHO state is determined to be satisfied if the signal quality between the UE and the base stations is above a predetermined threshold.

In certain implementations, the IHO state is enabled when the difference of the signal quality between the UE and the serving base station, and the signal quality between the UE and at least another neighboring base station is below a predefined threshold.

In certain implementations, if the condition for the IHO state is satisfied, the implementations may include initializing a timer associated with the IHO state.

Certain aspects of the implementations may include cancelling the IHO state at the expiration of the IHO state timer.

In certain aspects, after initializing the IHO state timer, the implementations may also include receiving from the UE a signal quality indicator indicating that the signal quality between the UE and the serving base station is better than the signal quality between the UE and the candidate base stations and decrementing the IHO state timer.

In certain implementations, the received signal quality indicator indicates that a signal quality between the UE and at least one of the other base stations is better than a signal quality between the UE and the serving base station. Certain aspects may include, if the condition for the IHO state is satisfied, initializing a handover procedure to handover the UE to the target base station.

In certain implementations, the IHO state initiation is transparent to the wireless communications network.

In certain implementations, the signal quality indicator comprises an indication of a signal quality between the UE and the neighboring base station.

In certain implementations, in the IHO state, the method further comprises transmitting data packets destined for the UE to at least one of the IHO candidate base stations over a backhaul communications link.

In certain implementations, the data packets are PDCP packets.

In certain implementations, in the IHO state, the method further comprises transmitting one or both of a radio resource control message or a non-access stratum (NAS) message to at least one of the IHO candidate base stations.

In certain implementations, determining, from the signal quality indicator, whether a condition for an IHO state is satisfied comprises receiving an acknowledgement signal from the UE.

In certain aspects, in the IHO state, the implementations may include receiving a request from the UE for a handover from the serving base station to one of the IHO candidate base stations and initializing a handover procedure to handover the UE to the IHO candidate base station.

Certain aspects of the implementations may include canceling the IHO state.

In certain aspects, in the IHO state, the implementations may include receiving a request from the UE to stay with the serving base station and sending IHO cancellation message to the IHO candidate base stations.

In certain aspects, in the IHO state, the implementations may also include receiving a signal quality indicator indicates that a signal quality between the UE and an IHO candidate base station is better than a signal quality between the UE and the serving base station, and transferring control of communications for the UE to the IHO candidate base stations.

Certain implementations may include receiving control of communications for the UE from the IHO candidate base station.

Certain implementations may include receiving a message of handover from the candidate base station, the candidate base station acting as an anchor base station for the UE and cancelling the intermediate handover state.

In certain implementations, the message indicates a handover to another base station.

In certain implementations, the message indicates the UE to stay with the anchor base station.

In certain implementations, the receive signal quality comprised at least one of the following: reference signal receive quality, reference signal receive power, signal to interference plus noise ratio, or average packet delay.

In certain implementations, the signal quality indicator indicates that the UE is proximate to a plurality of neighboring base stations and can receive data packets from at least a subset of the plurality of neighboring base stations.

In certain aspects of the implementations, the base station may be configured to select one or more neighboring base station from a plurality of neighboring base stations when the DL signal quality indicator received from the UE is above a predefined threshold. An IHO request message may be sent to the one or more neighboring base stations. An IHO response may be received from the one or more neighboring base stations. The IHO response may be evaluated to determine the IHO candidate base stations.

In certain implementations, the predefined threshold is a UE specific parameter and selected to satisfy the promised Quality of Service (QoS) to the UE.

In certain implementations, evaluating the IHO responses may include selecting a neighboring base station as a potential IHO candidate base station when the neighboring base station responds positively to the IHO request. The IHO candidate base stations may be chosen when the number of potential IHO candidate base stations is above a maximum number, N, of allowed IHO candidate base stations. IHO cancellation messages may be transmitted to the neighboring base stations which accepted the IHO request but are not included in the subset of IHO candidate base stations.

In certain implementations, choosing the IHO candidate base stations may include ordering the IHO candidate base stations in decreasing order signal quality indicator and selecting the IHO candidate base stations starting from the first in the order list and up to the maximum allowed IHO candidate base stations.

In certain implementations, the maximum number of IHO candidate base stations, N, is a network configuration dependent parameter.

In certain aspects of the implementations, choosing the IHO candidate base stations comprises selecting N base stations having a highest signal quality indicator.

In certain aspects of the implementations, the base station may be configured to start an IHO timer. An IHO initiation message may be sent to the UE initiating an IHO state. Data may be transmitted to the UE.

In certain implementations, the value of the IHO timer is included in the IHO initiation message to the UE.

In certain implementations, the value of IHO timer is included in the IHO request message to the neighboring base stations.

In certain implementations, the serving base station is a default anchor base station after the IHO state is initiated, and the anchor base station in IHO state is configured to assign DL resources and grant UL resources to the UE and send/receive data packets to/from the UE.

In certain aspects of the implementations, the base station may be configured to, during the IHO state, transfer anchor base station functionality to one of the IHO candidate base stations when the DL signal quality from the IHO candidate base station as indicated in the DL signal quality indicator is better than the DL signal quality from the serving base station.

In certain aspects of the implementations, the base station may be configured to, during the IHO state, initiate a handover to one of the IHO candidate base stations when the DL signal quality from the IHO candidate base station and from the serving base station meets HO criteria.

In certain implementations, meeting the HO criteria comprises the DL signal quality from the serving base station to be inferior to the DL signal quality from the IHO candidate base station by a predefined threshold.

In certain aspects of the implementations, the base station may be configured to, during the IHO state, initiate a stay state when the DL signal quality, as indicated in the DL signal quality indicator, from all the IHO candidate base stations and serving base station meets criteria for stay state.

In certain implementations, the criteria for stay state comprises the DL signal quality from the IHO candidate base station is inferior to the DL signal quality from the serving base station by a predefined threshold.

In certain aspects of the implementations, the base station may be configured to, during the IHO state, initiate a handover to a non-IHO candidate base station when the DL signal quality from the non-IHO candidate base station and serving base station meet HO criteria.

In certain implementations, the HO criteria may include the DL signal quality from the serving base station is inferior to the DL signal quality from the non-IHO candidate base station by a predefined threshold.

In certain implementations, the IHO state is determined to be satisfied if the signal quality between the UE and the base stations is above a predetermined threshold.

In certain implementations, the IHO state is enabled when the difference of the signal quality between the UE and the serving base station, and the signal quality between the UE and at least another neighboring base station is below a predefined threshold.

In certain aspects of the implementations, the base station is configured to, if the condition for the IHO state is satisfied, initializing a timer associated with the IHO state.

In certain aspects of the implementations, the base station may be configured to cancel the IHO state at the expiration of the IHO state timer.

In certain aspects of the implementations, the base station may be configured to, after initializing the IHO state timer, receiving from the UE a signal quality indicator indicating that the signal quality between the UE and the serving base station is better than the signal quality between the UE and the candidate base stations and decrementing the IHO state timer.

In certain implementations, the received signal quality indicator indicates that a signal quality between the UE and at least one of the other base stations is better than a signal quality between the UE and the serving base station. The base station may be further configured to, if the condition for the IHO state is satisfied, initialize a handover procedure to handover the UE to the target base station.

In certain implementations, the IHO state initiation is transparent to the wireless communications network.

In certain implementations, the signal quality indicator comprises an indication of a signal quality between the UE and the neighboring base station.

In certain implementations, in the IHO state, the method further comprises transmitting data packets destined for the UE to at least one of the IHO candidate base stations over a backhaul communications link.

In certain implementations, the data packets are PDCP packets.

In certain implementations, in the IHO state, the method further comprises transmitting one or both of a radio resource control message or a non-access stratum (NAS) message to at least one of the IHO candidate base stations.

In certain implementations, determining, from the signal quality indicator, whether a condition for an IHO state is satisfied comprises receiving an acknowledgement signal from the UE.

In certain aspects of the implementations, the base station may be configured to, in the IHO state, receive a request from the UE for a handover from the serving base station to one of the IHO candidate base stations and initialize a handover procedure to handover the UE to the IHO candidate base station.

In certain aspects of the implementations, the base station may also be configured to cancel the IHO state.

In certain aspects of the implementations, the base station may be configured to, in the IHO state, receive a request from the UE to stay with the serving base station and send IHO cancellation message to the IHO candidate base stations.

In certain aspects of the implementations, the base station may be configured to, in the IHO state, receive a signal quality indicator indicates that a signal quality between the UE and an IHO candidate base station is better than a signal quality between the UE and the serving base station and transfer control of communications for the UE to the IHO candidate base stations.

The base station may be configured to receive control of communications for the UE from the IHO candidate base station.

Certain aspects of the implementations may include the base station receiving a message of handover from the candidate base station, the candidate base station acting as an anchor base station for the UE cancelling the intermediate handover state.

In certain implementations, the message indicates a handover to another base station.

In certain implementations, the message indicates the UE to stay with the anchor base station.

In certain implementations, the target base station is another IHO candidate base station or another non-IHO base station or the anchor base station.

Certain aspects of the implementations may include receiving from the UE a signal quality indicator indicating that the signal quality between the UE and a second base station is better than the signal quality between the UE and the candidate base stations and transferring anchor functionality to the second base station.

Certain aspects of the implementations may also include initializing a timer associated with the IHO state.

Certain aspects of the implementations may also include cancelling the IHO state at the expiration of the IHO state timer.

In certain implementations, the measurement report sent by the UE includes the receive signal quality with respect to the serving base station and at least one other neighbor base station.

In certain implementations, the receive signal quality comprised at least one of the following: reference signal receive quality, reference signal receive power, signal to interference plus noise ratio, or average packet delay.

In certain implementations, the anchor base station is the serving base station.

In certain implementations, the message initiating the IHO state includes at least one of the following:
an IHO timer value;
a list of IHO candidate base stations;
a descriptor of a handover algorithm; or representative parameter values of a handover algorithm.

In certain implementations, the UE initiates the IHO state by initiating a IHO timer and determining an anchor base station.

In certain implementations, the UE initiates the IHO state by acquiring DL and UL synchronization with respect to the candidate base stations.

In certain implementations, the UE initiates the IHO state by acquiring system information parameters of the candidate base stations.

In certain implementations, when the UE is in the IHO state, the signal quality can be monitored with respect to the serving base station and the candidate base stations. The signal quality report can be sent to the anchor base station. A message can be received from the anchor base station indicating that the anchor functionality is to be transferred to a different base station, wherein upon transferring the anchor functionality, the different base station becomes the anchor base station. Radio resource assignment and grant messages can be received from the current anchor base station. Data packets can be transmitted to and received from the current anchor base station.

In certain implementations, when the UE is in the IHO state, the signal quality with respect to the serving base station and the at least one neighbor base station can be monitored. A measurement report can be sent to the anchor base station. A message can be received from the anchor base station, wherein the message comprises an indication to handover to a target base station. The IHO state can be cancelled and the UE can move to the target base station.

In certain implementations, the target base station is a IHO candidate base station.

In certain implementations, the target base station is the anchor base station.

In certain aspects, when the UE is in the IHO state, the signal quality with respect to the serving base station and one or more candidate base stations can be monitored. The UE can send an indication of its desired candidate base station(s) to the anchor base station, wherein the indication includes an indication to handover to a target base station. A message may be received from the anchor base station. The IHO state can be cancelled. The UE can transfer to the candidate base station.

In certain implementations, the target base station is the anchor base station.

In certain implementations, the target base station is a IHO candidate base station.

FIG. 1 is schematic representation of an example heterogeneous wireless communication network 100. The term "heterogeneous wireless communication network" or "heterogeneous network" may also be referred to as a "Hetnet." The illustrated heterogeneous network 100 includes a core network 110 and a macro cell or overlay cell 120. The term "cell" or "wireless cell" generally refers to an area of coverage of wireless transmission by a network or network component, such as an access node. The core network 110 can be connected to the Internet 160. In the illustrated implementation, the macro cell 120 can include at least one base station. The term "base station" can be interchangeably used with a network node, an access node, or a network component. Two or more base stations may operate on the same radio frequency or on different radio frequencies. In this disclosure, the term "base station" is sometimes interchangeably used with the term "cell," where the base station provides the coverage of wireless transmission of the cell.

The base station can be an overlay access node 121 connected to the core network 110 via a backhaul link 111a, including optical fiber or cable. The term "overlay access node" generally refers to a network element or component that at least partly serves to form a wireless cell. In one implementation in which the network 100 is an LTE network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro cell can be generally referred to as a "macro eNB." The term "eNB" may be interchangeably used with an "evolved node B." The eNBs may cooperate to conduct a handover procedure for User Equipment (UE) in the network 100. To conduct the handover procedure, the eNBs may exchange control information via the backhaul link 111a or 111b or 111c or 111d.

The network 100 can also include one or more underlay cells, for example, a pico cell 130 and a femto cell 140. The underlay cells can have a coverage at least partially overlapping with the coverage of the macro cell 120. While the term "underlay cell" is described herein in the context of the long term evolution (LTE) standard, other wireless standards can also have components similar to underlay cells. The implementations described herein can be adapted for such standards without departing from the scope of this disclosure. Although FIG. 1 illustrates only one pico cell and only one femto cell, the network 100 can include more or less cells. The underlay cells 130, 140 have a smaller coverage than the overlay cell 120. For example, in a suburban environment, the overlay cell 120 may have a coverage radius of 0.5 kilometer, while the underlay cells 130, 140 may have a coverage radius of 0.2 kilometer. Access nodes 131, 141 forming the underlay cells 130, 140 can use a lower transmission power than that of the overlay access node 121. The underlay cells 130, 140 may further include a range expansion area used for increasing the coverage area for the cells having a smaller coverage.

The pico cell 130 can include a pico eNB 131 connected to the core network 110 via a backhaul link 111b and to the macro eNB 121 via a backhaul link 111c. The backhaul links 111b and 111c may include cable, fiber, wireless links, or others. In some implementations, the pico eNB 131 can have a transmission power that is, for example, about 30 dBm, which is about 13 dB lower than that of the macro eNB 121.

The femto cell 140 can include a femto eNB 141 connected to the core network 110 via the Internet 160 via a wired or wireless connection. The term "femto eNB" can also be referred to as a "home eNB (HeNB)." The femto cell 140 is a subscription based cell. Three access modes can be defined for HeNBs: closed access mode, hybrid access mode and open access mode. In closed access mode, HeNB provides services only to its associated closed subscription group (CSG) members. The term "closed subscription group (CSG)" can be interchangeably used with closed subscriber group. Hybrid access mode allows HeNB to provide services to its associated CSG members and to non-CSG members. In some implementations, the CSG members are prioritized to non-CSG members. An open access mode HeNB appears as a normal eNB.

The network 100 can also include a relay node 150 which serves to wirelessly relay data and/or control information between the macro eNB 121 and user equipment 170. The macro eNB 121 and the relay node 150 can be connected to each other via a wireless backhaul link 111d. In such an instance, the macro eNB 121 can be referred to as a donor eNB. In some implementations, the relay node 150 can have a transmission power that is, for example, about 30 or 37 dBm, which is about 13 dB or 6 dB lower than that of the macro eNB 121. The term "underlay access node" generally refers to pico eNBs, femto eNBs, or relay nodes.

The user equipment 170 can communicate wirelessly with any one of the overlay access nodes 121 or the underlay access nodes 131, 141, 150, depending on the location or the existence of subscription in the case of the femto cell 140. The term "user equipment" ("UE") can refer to various devices with telecommunications capabilities, such as mobile devices and network appliances. The UE 170 may switch from the coverage of one cell to another cell, for example, from the coverage of the pico cell 130 to the coverage of the macro cell 120, i.e., a pico-to-macro cell change, or from the coverage of a macro cell 120 to the coverage of the pico cell 130, i.e., a macro-to-pico cell change. A handover procedure may be conducted to ensure that the UE does not lose connection with the network while switching between cells.

Examples of user equipment include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. In some implementations, the UE 170 may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
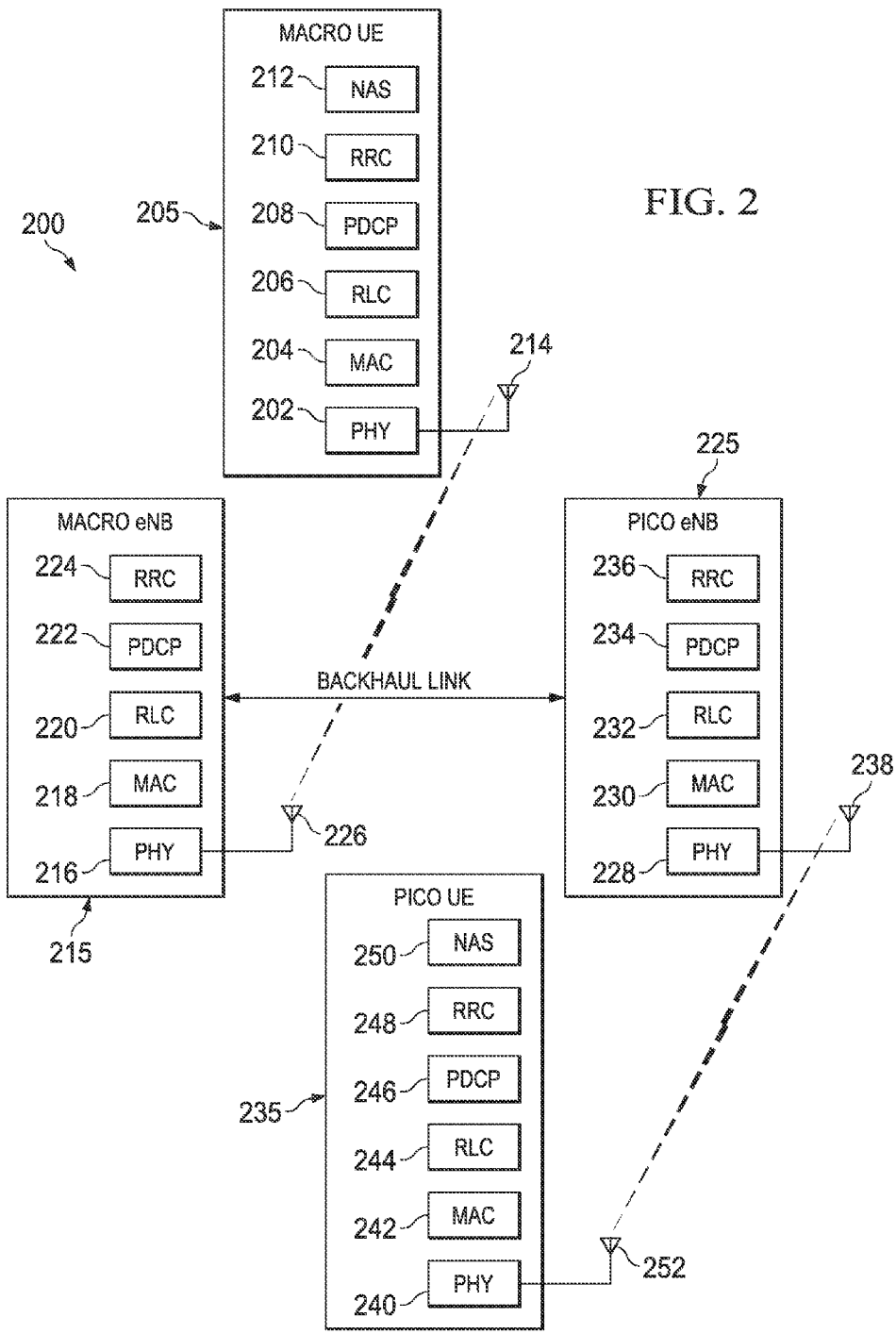
FIG. 2 is a schematic block diagram illustrating various layers of access nodes and user equipment in a wireless communication network.

FIG. 2 is a schematic block diagram 200 illustrating various layers of access nodes and user equipment in an example wireless communication network. The illustrated system 200 includes a macro eNB 215, a pico eNB 225, a macro UE 205, and a pico UE 235. Here macro UE 205 and Pico UE 235 are UEs which are either actively communicating or camping on macro eNB 215 and pico eNB 225 respectively. The macro eNB 215 and the pico eNB 225 can be collectively referred to as a "network," "network components," "network elements," "access nodes," or "access devices." FIG. 2 shows only these four devices (also referred to as "apparatuses" or "entities") for illustrative purposes, and the system 200 can further include one or more of these devices without departing from the scope of this disclosure. The macro eNB 215 can communicate wirelessly with the macro UE 205. The pico eNB 225 can communicate wirelessly with the pico UE 235. The macro eNB 215 can communicate with the pico eNB 225 via a backhaul link, for example, an X2 backhaul link, a wireless connection, or a combination thereof. In some implementations, the macro eNB 215 and pico eNB 225 may exchange handover control information via the backhaul link.

Each of the devices 205, 215, 225 and 235 includes a protocol stack for communications with other devices via wireless or wired connection. The macro eNB 215 can include a physical (PHY) layer 216, a medium access control (MAC) layer 218, a radio link control (RLC) layer 220, a packet data convergence protocol (PDCP) layer 222, and a radio resource control (RRC) layer 224. In the case of user plane communications for data traffic, RRC layer is not involved. The macro eNB 215 can also include one or more transmit and receive antennas 226 coupled to the PHY layer 216. In the illustrated implementation, a "PHY layer" can also be referred to as "layer 1 (L1)." A MAC layer can also be referred to as "layer 2 (L2)." The other layers (RLC layer, PDCP layer, RRC layer and above) can be collectively referred to as a "higher layer(s)."

Similarly, the pico eNB 225 includes a PHY layer 228, a MAC layer 230, a RLC layer 232, a PDCP layer 234, and an RRC layer 236. The pico eNB 225 can also include one or more antennas 238 coupled to the PHY layer 228.

The macro UE 205 can include a PHY layer 202, a MAC layer 204, a RLC layer 206, a PDCP layer 208, an RRC layer 210, and a non-access stratum (NAS) layer 212. The macro UE 205 can also include one or more transmit and receive antennas 214 coupled to the PHY layer 202. Similarly, the pico UE 235 can include a PHY layer 240, a MAC layer 242, a RLC layer 244, a PDCP layer 246, an RRC layer 248, and a NAS layer 250. The pico UE 235 can also include one or more transmit and receive antennas 252 coupled to the PHY layer 240.

Communications between the devices, such as between the macro eNB 215 and the macro UE 205, generally occur within the same protocol layer between the two devices. Thus, for example, communications from the RRC layer 224 at the macro eNB 215 travel through the PDCP layer 222, the RLC layer 220, the MAC layer 218, and the PHY layer 216, and are sent over the PHY layer 216 and the antenna 226 to the macro UE 205. When received at the antenna 214 of the macro UE 205, the communications travel through the PHY layer 202, the MAC layer 204, the RLC layer 206, the PDCP layer 208 to the RRC layer 210 of the macro UE 205. Such communications are generally done utilizing a communications sub-system and a processor, as described in more detail below.

Some typical functionality of different protocol layers is briefly described below. The NAS protocol, which runs between a core network and the UE, can serve for control purposes such as authentication, session management, and UE mobility management. The RRC layer in the eNB may be capable to make handover decisions based on neighbor cell measurements sent by the UE, broadcasts system information, controls UE measurement and allocate cell-level temporary identifiers to active UEs. The functionality of PDCP layer includes, among other things, encryption of user data stream and header compression and decompression. The RLC layer can be used to format and transport traffic between the UE and the eNB. The MAC layer is responsible for, among other things, control of random access procedure, scheduling of data packets, and mapping of logical channels to transport channels. The PHY layer may involve modulation and demodulation, error protection of data package by utilizing coding, radio frequency (RF) processing, radio characteristics measurements and indications to higher layers, and support for multiple input multiple output (MIMO) if multiple antennas are equipped with the eNB or the UE.

In the implementations described in this disclosure, various steps and actions of the macro eNB, macro UE, pico eNB, and pico UE can be performed by one or more of the layers described above in connection with FIG. 2. For example, handover procedure for the macro UE 205 can be performed by one or more of the layers 202-212 of the macro UE 205. Handover procedure by the pico UE 235 can be performed by one or more of the layers 240-250 of the pico UE 235. Channel quality measurement may be performed by the PHY layer and MAC layer of the macro UE 205 and pico UE 235. For another example, handover of UE may be initiated by the RRC layer 224 of the macro eNB 215 and the RRC layer 236 of the pico eNB 225.

Figure 3:
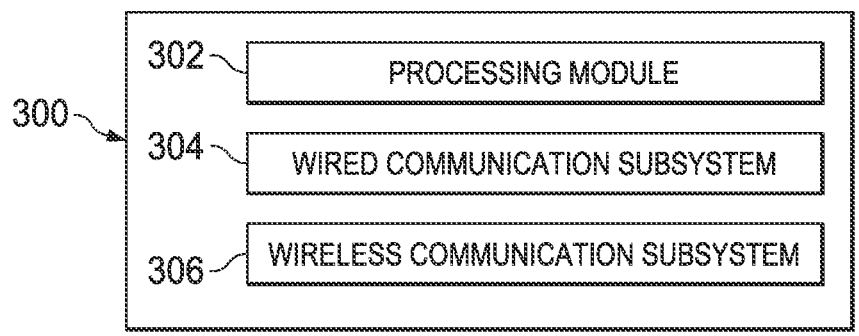
FIG. 3 is a schematic block diagram illustrating an access node device.

FIG. 3 is a schematic block diagram 300 illustrating an access node device. The illustrated device 300 includes a processing module 302, a wired communication subsystem 304, and a wireless communication subsystem 306. The wireless communication subsystem 306 can receive data traffic and control traffic from the UE. The wired communication subsystem 304 can be configured to transmit and receive control information between other access node devices via backhaul connections. The processing module 302 can include one or more processing components (also referred to as "processors" or "central processing units" (CPUs)) capable of executing instructions related to one or more of the processes, steps, or actions described above in connection with one or more of the implementations disclosed herein. The processing module 302 can also include other auxiliary components, such as random access memory (RAM), read only memory (ROM), secondary storage (for example, a hard disk drive or flash memory). The processing module 302 can form at least part of the layers described above in connection with FIG. 2. In particular, the processing module 302 may be configured to receive signal quality indicators from the UE. The processing module 302 may also be configured to determine a handover or an intermediate handover based on the received signal quality indicators, and to transmit a handover or an intermediate handover command. The processing module 302 can execute certain instructions and commands to provide wireless or wired communication, using the wired communication subsystem 304 or a wireless communication subsystem 306. A skilled artisan will readily appreciate that various other components can also be included in the device 300.

Figure 4:
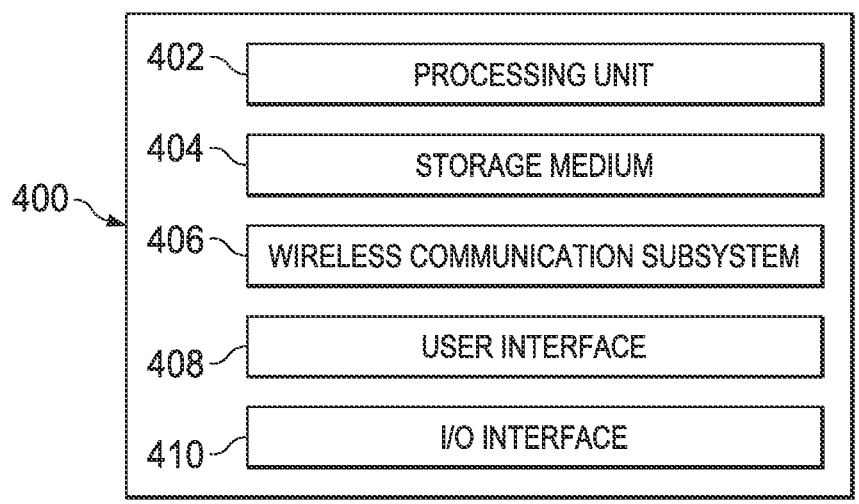
FIG. 4 is a schematic block diagram illustrating a user equipment device.

FIG. 4 is a schematic block diagram 400 illustrating user equipment device. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include one or more processing components (also referred to as "processors" or "central processing units" (CPUs)) configured to execute instructions related to one or more of the processes, steps, or actions described above in connection with one or more of the implementations disclosed herein. In particular, the processing module 402 may be configured to estimate signal quality associated different cell and transmit signal quality indicators to an access node. The processing module 402 may also be configured to receive signaling from access nodes and perform operations accordingly, such as transitions between a handover state and an intermediate handover state. The processing module 402 can form at least part of the layers described above in connection with FIG. 2. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital signal processing (DSP) unit. In some implementations, the subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 410 can include, for example, a universal serial bus (USB) interface. A skilled artisan will readily appreciate that various other components can also be included in the device 400.

Figure 5:
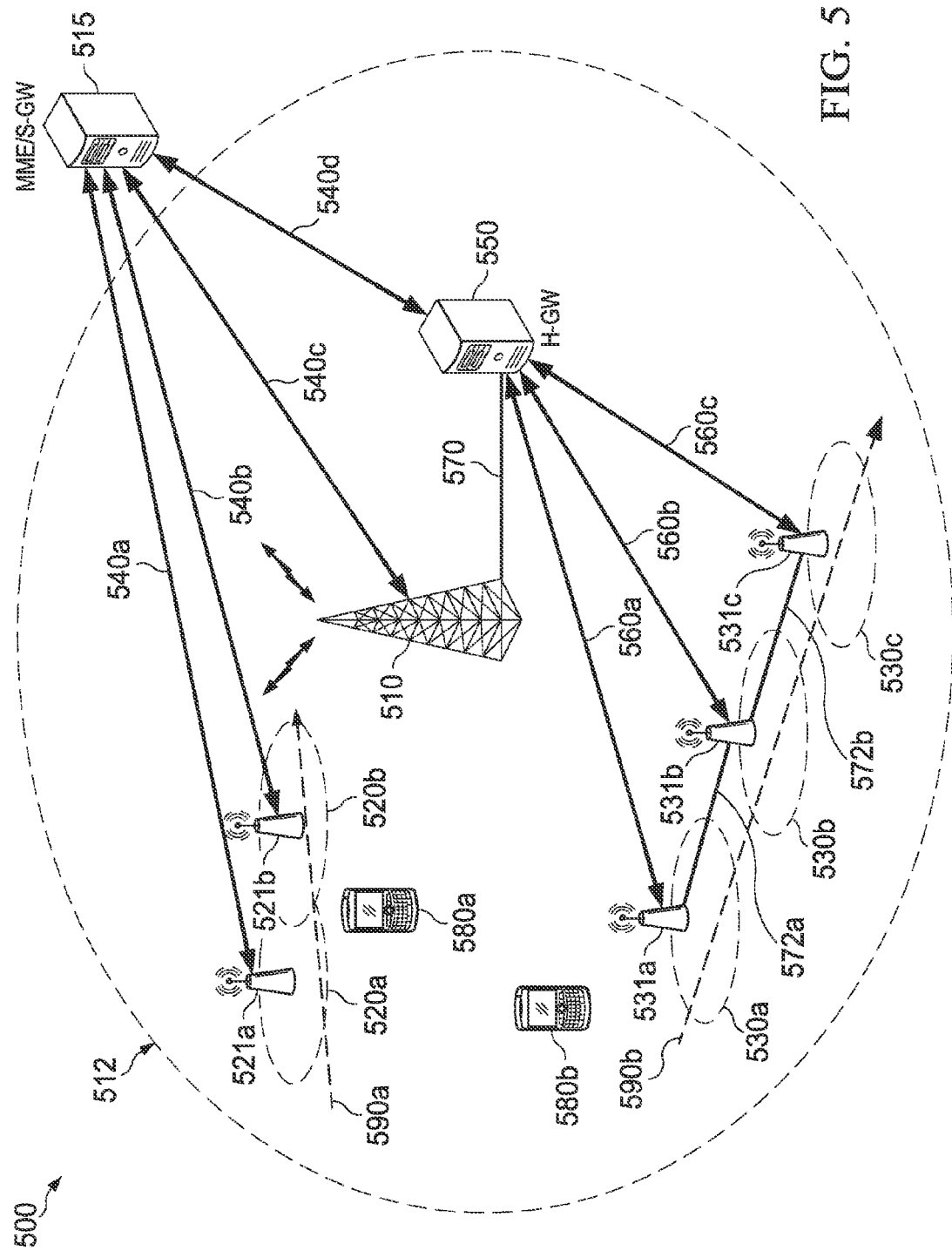
FIG. 5 is a schematic presentation of an example deployment of a heterogeneous network.

FIG. 5 is a schematic presentation 500 of an example deployment of a heterogeneous network. As shown in FIG. 5, a macro eNB 510 provides a macro coverage area 512. Pico cells 520a and 520b and a femto cell cluster 530a-c may be situated within the coverage of a macro cell 512. The pico cell eNBs 521a and 521b and macro cells eNB 510 are connected to EPC (Evolved Packet Core) network through the MME (Mobility Management Entity)/S-GW (Serving Gateway) 515 via backhaul connections 540a-c. The backhaul connection can be, for example, an S1 interface. Femto cell eNBs (HeNBs) 531a-c are connected to an intermediate gateway HeNB-GW 550 through backhaul links 560a-c such as S1 interfaces. The HeNB-GW 550 can be connected with the MME/S-GW 515 via an S1 interface 540d as well. Backhaul connections may exist between different types of eNBs. For example, the macro eNB 510 and the pico eNBs 521a-b can be connected through an X2 interference (not shown). The femto eNBs 531a-c may be connected with each other via the X2 interface 572a-b. Moreover, an X2 interference 570 can be also introduced between the macro eNB 510 and HeNB-GW 550 in order to facilitate communications and coordination between the macro cell 512 and the femto cells 531a-c and provide seamless service coverage for UEs in this area.

When a UE moves around in the area of 512, it may traverse different cells and trigger multiple handovers. In one example, a UE 580a may move along a trajectory 590a where it starts from the pico cell 520a, gets exposed to the coverage area of the macro cell 512 when it arrives at cell edge of the pico cell 520a, and then enters another pico cell 520b. During this trajectory, two handovers may occur: a first one from the pico cell 520a to the macro cell 512 and a second one from macro cell 512 to the next pico cell 520b. In another example, if UE 580b moves along a trajectory 490b, similarly, there can be multiple handovers between the macro cell 512 and the femto cells 530a-c. Frequent handovers between multiple cells can result in increases of signalling overhead and delay, prolonged data interruptions, and degradation of the QoS of UEs.

In heterogeneous communication networks, especially under a small cell cluster deployment as shown in FIG. 5, large overlaps in coverage between macro and femto/pico cells are generally expected. Cell boundaries between the macro and femto/pico cells can have acceptable coverage for control signaling receipt. Furthermore, some type of interference cancellation and/or coordination methods is generally used in this type of deployments. Therefore a UE may receive control signaling from multiple cells and collaborate with multiple cells for handover operations accordingly. The UE may maintain downlink (DL) and uplink (UL) transmissions synchronization within the cluster deployment. The UE may control its transmit power and timing on the uplink based on the receive point at any given time. In an alternate embodiment, the UE may be capable of maintaining separate UL and DL synchronization with the multiple neighboring cells within an acceptable range simultaneously.

To restrict the handover and reduce unnecessary and unwanted data interruptions, an intermediate handover (IHO) state can be introduced. With an enablement of the IHO state, the number of handovers can be reduced to one for both trajectories 590a-b mentioned above. For example, for the trajectory 590a where the UE 580a is traversing between the pico cells 520a and 520b, the handover to/from macro cell 512 can be avoided by keeping the UE 580a to the pico cell 520a until the UE 580a completely enters the coverage area of pico cell 520b. Then, the UE 580a can only be handed over once from the pico cell 520a to the pico cell 520b. Implementations of the IHO state will be described in further details below.

Figure 6A:
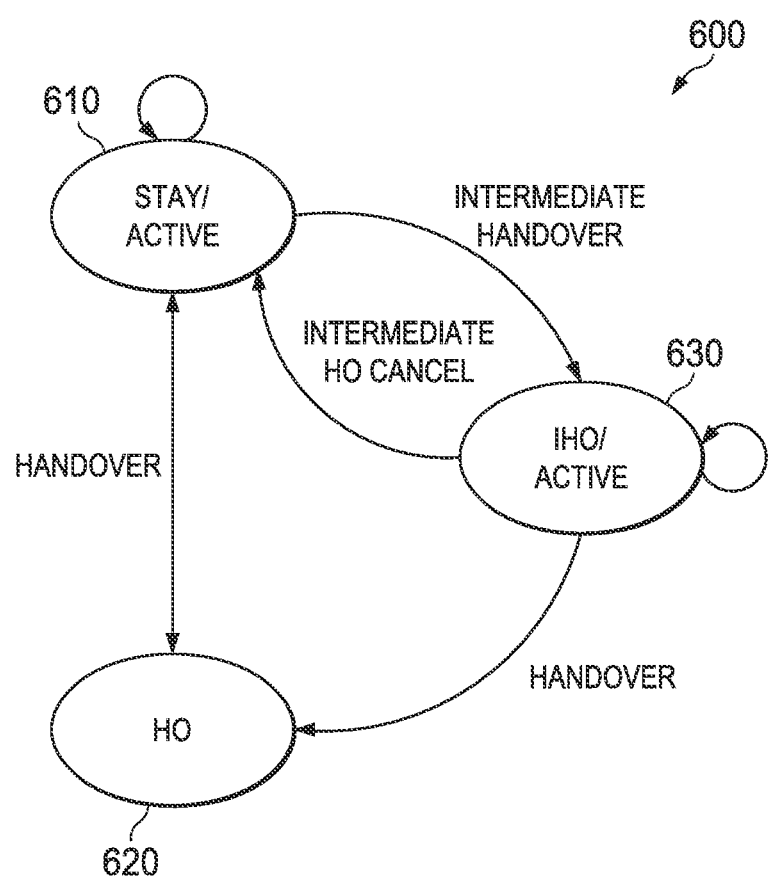
FIG. 6*a* is a schematic state diagram illustrating a handover mechanism involving an intermediate handover (IHO) state.

FIG. 6a is a schematic state diagram 600 illustrating a handover mechanism involving the IHO state. In general, when a UE is registered with a serving cell, it has RRC (Radio Resource Control) connection with the serving cell and can actively communicate with the core network. A UE in "STAY/ACTIVE" 610 is in RRC ACTIVE state with the serving cell and can transmit and receive, for example, Packet Data Control Protocol (PDCP) packets, from the serving eNB. The UE may send a signal quality indicator to the serving base station. The signal quality indicator can be a measurement feedback, such as Channel Quality Information (CQI) reports of a target cell. The serving cell may send an RRC message so that the UE may transition to "HO" state 620 or "IHO" state 630 based on the measurement reports from the UE. From the "IHO" state 630, the UE may transition back to RRC ACTIVE state 610 with the serving cell or to a "HO" state. This transition may happen at the request of the serving cell or can be triggered autonomously. Once the HO is performed the UE goes into "STAY/ACTIVE" state with a target cell.

In the IHO state 630, the UE is not handed over to any of the target cells completely. These target cells are referred to as IHO candidate cells during the IHO state. An example method to select IHO candidate cells will be discussed in further details below. The PDCP packets from the serving eNB are routed to the IHO candidate eNB(s) over a backhaul link, such as the X2 interface, which connects eNBs. If the QoS of a candidate cell is expected to be better than that of the serving cell, the PDCP packets are scheduled and transmitted by that candidate cell to the UE. Recall that the PDCP processing can provide encryption of the data packets for security and identity protection. During the IHO state, the encryption of the data packets may remain unchanged and still be conducted by the serving cell. Therefore, the data rerouting from the serving cell to the candidate cell is completely transparent to the EPC network. Moreover, most control signaling of the RRC and NAS may also originate from the serving eNB and be rerouted to the candidate eNB(s), for example, through backhaul links. Therefore, the IHO state in this disclosure can also be referred as a network agnostic mobility management (NA-MM) state, which means the state is transparent to the core network. When the expected QoS difference with respect to serving cell and IHO candidate cell is larger than a threshold, the UE may be instructed to handover completely to one of the candidate cells (i.e. exits the intermediate handover state).

In the intermediate handover state, the UE may transmit/receive packets to/from either the target cell or the serving cell. The cell which actively transmits the data to the UE is referred to as the Anchor cell. The switching of transmission/receipt between the cells may be decided by the Anchor cell. The packet transmission/receipt cell may be indicated in an RRC message transmitted by the anchor cell.

Normally the switching of anchor cell can occur at the start of a new IP packet/PDCP SDU transmission. For DL, the anchor eNB is aware of the transmission of a new PDCP SDU. In the case of UL, UE may be aware of this condition and inform the completion of the IP packet/PDCP SDU so that new resources are assigned by the new anchor cell. The IP packet segmentation is done independently at each candidate cell. Normally the switching between the candidate cells is not expected to be very frequent. The switching times are typically dependent on the application type. For example, for Gaming applications, the IP packets tend to be small. In this case the switching between the cells may be faster (if the signal quality with respect to each cell varies very rapidly).

The IHO state may be time limited. Because each candidate cell participating in the IHO state may reserve resource for the UE, configuring a timer associate with the IHO state can avoid excessive system resource reserved for one UE whereas qualify of service of other UEs in the network may be affected. The value of the timer $T_{IHO}$ can be implementation specific, for example, depending on a deployment scenario. The network operator can have the freedom to configure the time limit for the IHO state to optimize the system performance. In some implementations, the serving eNB may send the value of the timer to the candidate cells during the IHO request.

The system operator can determine under what scenarios the IHO state can be enabled. For example, it might be set that IHO state can be only enabled if one or more of the neighboring cells are low power cells, i.e. pico/femto/relay cells/nodes. The IHO state may be enabled or disabled by the operator through OAM (Operations, Administration, and Maintenance) settings.

Figure 6B:
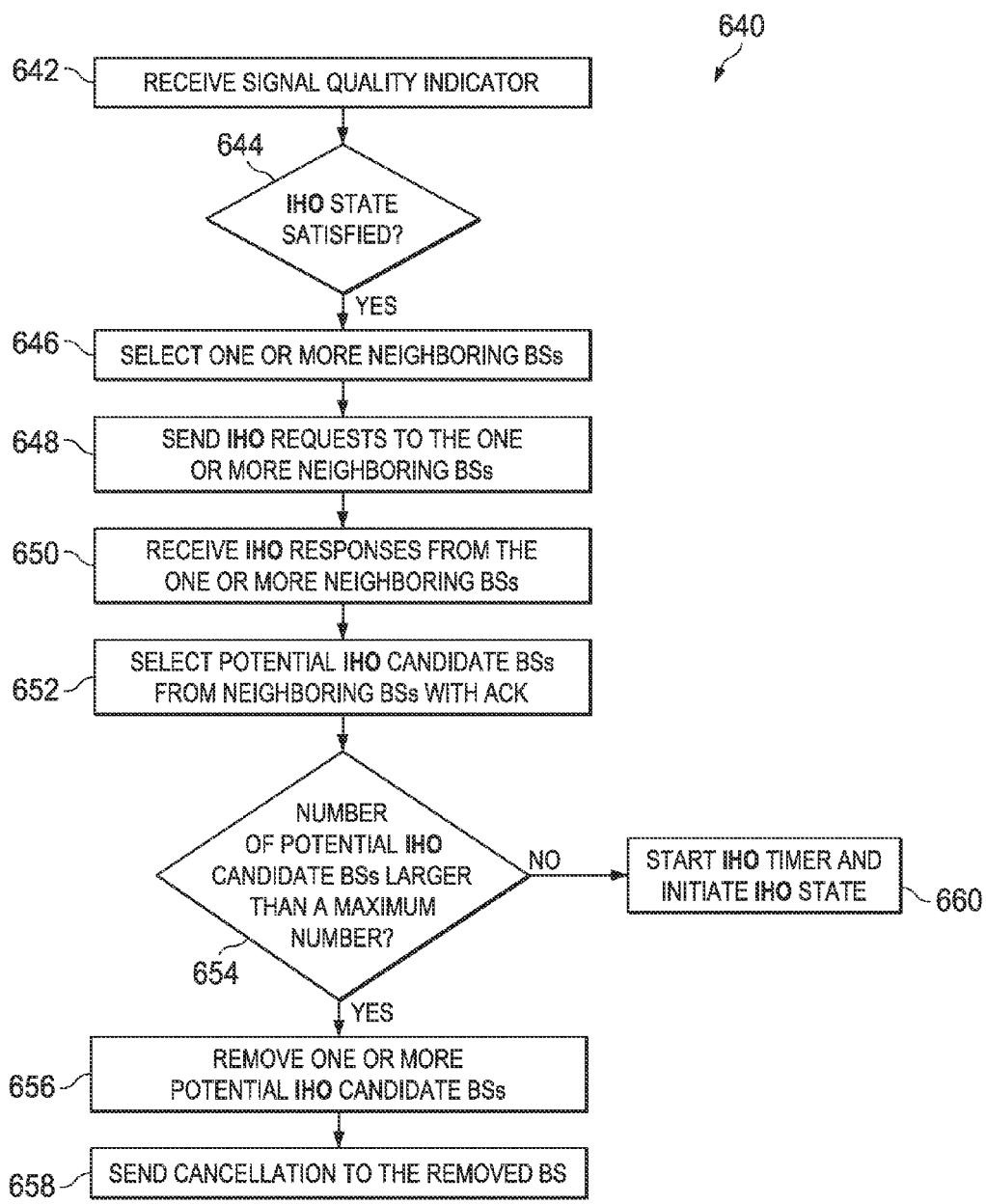
FIG. 6*b* is a schematic flow chart illustrating a method may be performed by a serving cell for IHO candidate cell selection.

FIG. 6b is a schematic flow chart 640 illustrating a method may be performed by a serving cell of a UE for IHO candidate cell selection. In a heterogeneous network, a UE may receive and measure downlink (DL) signal quality with respect to the serving cell, as well as a plurality of neighboring cells. A neighboring cell can be, for example, a macro cell, a pico cell, or a femto cell. The UE may send a DL signal quality indicator to the serving cell. The DL signal indicator may indicate the serving cell that the UE is proximate to one or more neighboring base stations and can receive data packets from the neighboring base stations. In some implementations, the DL signal indicator can be signal quality measurement feedback, such as Channel Quality Information (CQI) reports of the neighboring cells, or any other channel quality parameters. For example, the receive signal quality can include at least one of the following:

reference signal receive quality, reference signal receive power, signal to interference plus noise ratio, or average packet delay.

Upon the receipt of the signal quality indicator at step 642, the serving cell may determine whether a condition for an IHO state is satisfied based on the signal quality indicator from the UE at step 644. Given the condition satisfied, in step 646, the serving cell may select one or more neighboring base stations whose DL signal quality report is above a predefined threshold. The predefined threshold can be a UE specific parameter and selected to guarantee the promised Quality of Service (QoS) to the UE. Then, at step 648, the serving cell can send IHO request messages to the one or more neighboring base stations. The neighboring base stations can determine whether to participate in the IHO state based on several factors, such as, whether the base station has enough resource to allocate to the UE, and/or whether the UE is a subscription group (CSG) member if neighboring base station is a HeNB with closed access or hybrid access mode.

If a neighboring base station agrees to join the IHO state, it may reserve DL resource for the UE. The neighboring base stations may inform the serving cell their respective decisions via the IHO responses. After receiving the IHO responses from the neighboring cells in step 650, the serving cell can further select one or more potential IHO candidate base stations in step 652 out of the neighboring base stations that respond positively to the IHO request. Thus a group of potential IHO candidate base stations is formed.

In some implementations, the serving base station may compare the number of potential IHO candidate base stations with a maximum allowed number of IHO candidate base stations in step 654. The maximum allowed number can be a network configuration dependent parameter and be set by the network operator. If the number of potential IHO candidate base stations is above the maximum allowed number of IHO candidate base stations, the serving base station may remove one or more base stations from the group of potential IHO candidate base stations in step 656 and send cancellation messages to those base stations in step 658. If the number of potential IHO candidate base stations does not exceed the maximum allowed number of IHO candidate base stations, the base station can start an IHO timer and send a control information to the UE to initiate the IHO state. In some implementations, the control information can be sent via a radio resource control (RRC) message.

Figure 7A:
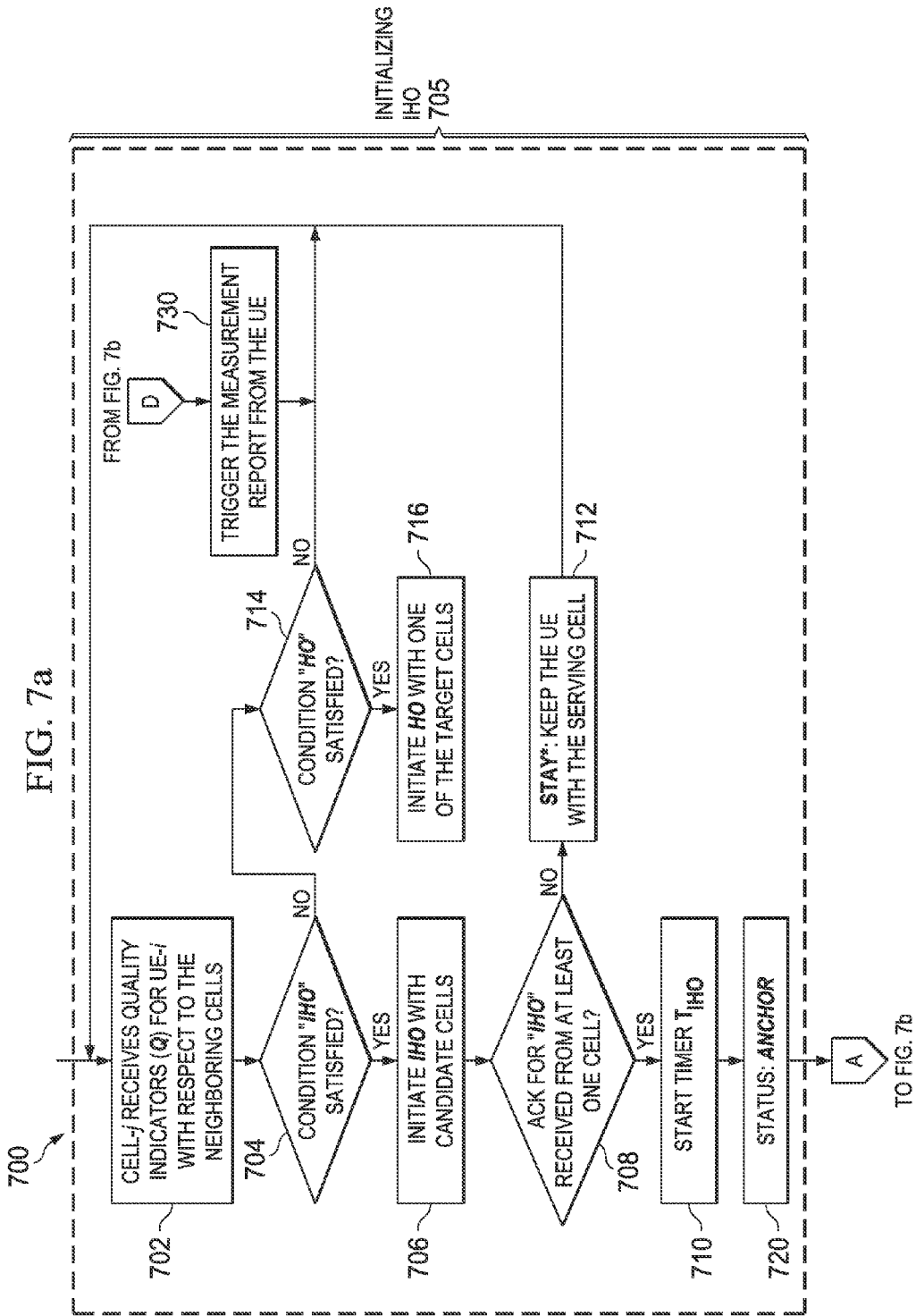
FIG. 7 is a flow chart illustrating an example method may be performed by a serving cell of a UE in a handover mechanism.
Figure 7B:
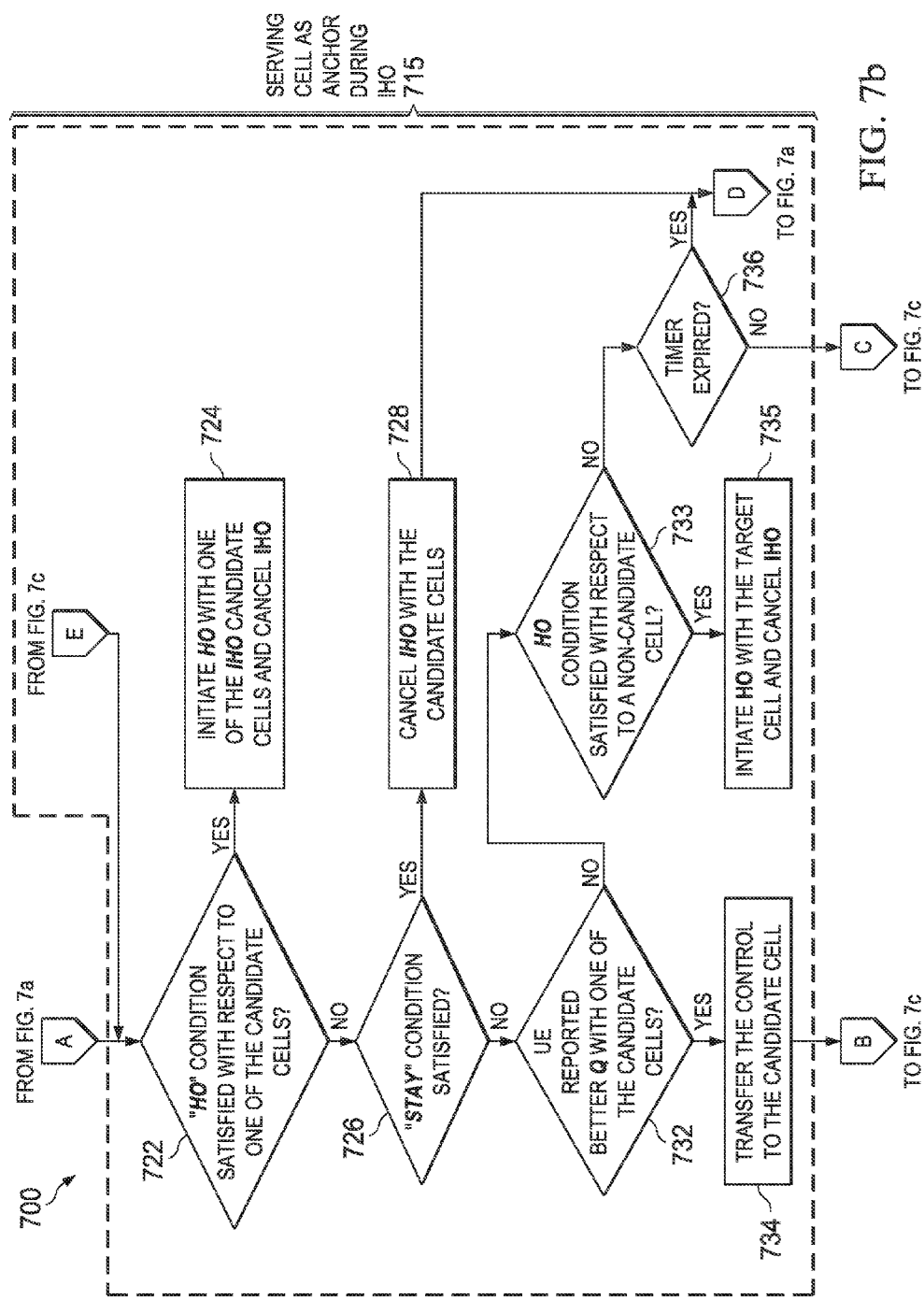
Figure 7C:
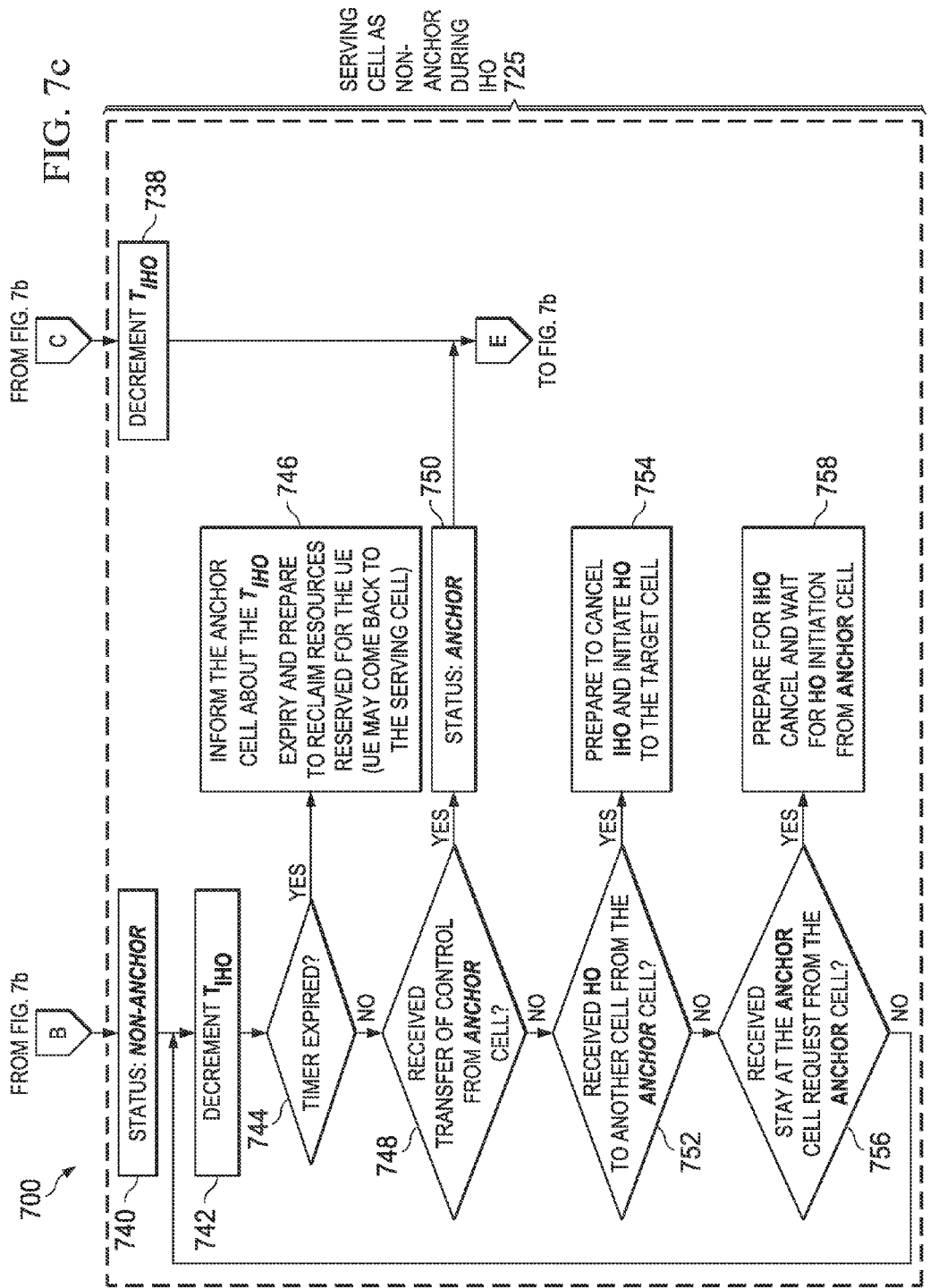

FIG. 7 is a flow chart 700 illustrating an example method may be performed by a serving cell of a UE during a handover mechanism. The handover mechanism can involve transitions among STAY/ACTIVE state 610, HO state 620, and IHO state 630. The method may contain three procedures: initializing IHO 705, procedures of the serving cell as Anchor cell during IHO 715, and procedures of the serving cell as Non-Anchor cell during IHO 725. The detailed procedures are described below.

During initializing IHO procedure 705, a serving cell of a UE, say, a serving cell-j of UE-i, at step 702, may receive signal quality indicators $Q_{ik}$ that represents the quality of the received signal at the receiver of UE-i from neighbouring cell-k, for k=0, . . . , N−1, as mentioned in step 642 of FIG. 6b. The signal quality indicators can be, for example, RSRP (Reference Signal Received Power), RSRQ (Reference Signal Received Quality), Channel Quality Information (CQI), or any other channel quality parameters. Those indicators can have associated values representative of the quality of the DL channel, signal, etc. These values can serve as quantitative measurements of quality of service (QoS) and can be used to compare measured signal against promised quality of service (QoS) quantitatively.

If the quality indicator satisfies the condition for IHO state 704, the serving cell-j can initiate IHO with one or more the neighbouring cells at step 706. The conditions for initiating IHO state will be described in further details below with an example HO algorithm. The serving cell can follow the method described in steps 644-660 of FIG. 6b to select a group of IHO candidate cells. Specifically, the IHO initiation to one or more neighbouring cells may be performed either in parallel (e.g., the X2AP (application protocol) messages requesting for IHO are scheduled to the neighbouring cells, for example, via broadcasting or multicasting) or serial (e.g., the X2AP messages requesting for IHO are scheduled in sequence). The serving cell may then wait for their respective responses of the neighbouring cells.

If one or more neighbouring cells acknowledge in participating the IHO state in step 708, the serving cell may start a timer $T_{IHO}$ for the IHO state in step 710. The value of the timer $T_{IHO}$ is dependent on deployment scenarios and is normally set by the network operator. In some implementations, the value of the IHO timer is included in the RRC message transmitted to the UE. In other implementations, the serving eNB may send the value of this parameter to the neighbouring cells during the IHO request.

If the serving cell does not receive any positive response from the neighbouring cells 708, the serving cell may keep the UE with it 712. The UE may remain in STAY state 610 with the serving cell. Then the serving cell may go back to step 702 waiting for the measurement reports from the UE containing the signal quality indicator with respect to the neighbouring cells.

Returning now to step 704, if the conditions for initiating IHO state is not met, the serving cell proceeds to step 714 in determining whether the condition for initiating HO state is satisfied. Given the HO conditions satisfied, the serving cell can then initiate a handover with one of the target cells 716. When the HO condition is not met in step 714, the serving cell goes back to step 702 waiting for the measurement reports from the UE with respect to neighbouring cells.

At the start of the IHO state, the default anchor cell can be the UE's serving cell. Following the step 710, the serving cell is in Anchor cell status 720 and can start procedures of the serving cell as Anchor cell during IHO 715. The functionality of the anchor base station can include assigning DL resources and granting UL resources for UE; and receiving/transmitting data packets to/from the UE.

In some embodiments, a "HO" condition may be satisfied with respect to one of the IHO candidate cells in step 722, the serving base station may initiate a handover to the IHO candidate base station and cancel the IHO state 724. The HO condition can include, for instance, that the reported DL signal quality indicator with respect to the serving base station has a value less than that of the DL signal quality indicator with respect to an IHO candidate base station by a predefined threshold.

In some other implementations, a "HO cancellation (STAY)" condition may be satisfied 726. The HO condition can include, for instance, that the DL signal quality from the IHO candidate base station has a value less than that of the DL signal quality from the serving base station by a predefined threshold. The UE may stay with the serving cell. The serving base station may cancel the IHO state with IHO candidate cells 728 by sending the appropriate cancel message to the candidate cells. It may trigger the UE to send measurement reports to the serving cell 730 and the serving cell goes back to step 702 waiting for the signal quality indicator.

During the IHO state, the decision of HO or HO cancellation (STAY) can be UE controlled. In some implementations, these decisions can be left to the network. In some UE-controlled embodiments, based on the quality indicator that the UE has with respective to the neighbouring cells, the UE can perform certain algorithm to determine whether a handover is needed and choose a target cell for the handover. For example, the decisional steps 722 and 726 can be whether the UE requests a HO to one of the IHO candidate cells, or whether the UE requests STAY with the serving cell, respectively. In some network-controlled embodiments, the anchor base station can determine whether the condition for HO or STAY is satisfied or not based on the signal quality indicators sent from the UE. More details about criteria/conditions for HO, STAY, and IHO states will be described with an exemplary HO algorithm below.

In some embodiments, the anchor cell may relinquish its anchor cell status based on the UE reported signal quality indicator during the IHO state. For example, one of the candidate cells may be assigned as the anchor cell if the measurement report from the UE indicates that the signal reception quality from the candidate cells is superior. In some implementations, the anchor base station can monitor the acknowledgement (ACK)/negative acknowledgement (NACK) of its UL/DL packets to make decision about whether to relinquish the anchor state. In the illustrated example in FIG. 7, if the received signal quality with respect to one of the candidate cells is better than that with the Anchor cell (i.e., the serving cell in this case) 732, the anchor cell may relinquish the anchor state and transfer the anchor control to the candidate cell in step 734.

In some implementations, a non-candidate base station may provide a better signal quality to the UE than the serving cell and the candidate cells. Therefore if the HO condition is satisfied with respect to the non-candidate cell in step 733, the non-candidate base station can be regarded as a target base station and the serving base station can initiate a handover to the target base station in step 735.

If no state transition is needed or requested, the serving cell may check whether the IHO timer is expired in step 736. Given that the IHO timer is still running, the serving cell can decrement the timer in step 738 can return to 720 as the anchor cell in the IHO state. If the IHO timer is found to be expired in step 736, the serving cell can go back to step 702 via step 730 to re-initiate the IHO with the same or a different set of candidate cells.

The procedures of the serving cell as Non-Anchor cell during IHO 725 can start after the serving cell transfers the Anchor control to another candidate cell in step 734. The serving cell enters Non-Anchor state 740 and may first decrement the IHO timer in step 742. The serving cell then checks whether the IHO timer is expired or not. Where the IHO timer expires, the serving cell can inform the Anchor cell about the expiry of $T_{IHO}$ and prepare to reclaim resources reserved for the UE 746. In this case, the serving cell may then exit the IHO state and the UE may come back to the serving cell.

If the IHO timer is still running 744, the serving base station may listen to control channels to see if any state transition is needed. For example, the serving base station may receive a transfer of Anchor control of communications for UE from the current Anchor cell in step 748. In this case, the serving cell can return to the Anchor status 750 (or equivalently 720), resume active data communications with the UE, and then further proceed from step 720.

In some implementations, the serving base station may receive a message of handover from the anchor base station indicating that the UE needs to handover to a target cell 752. The target base station can be either a candidate base station or a non-candidate base station. Then the serving base station may cancel the IHO state and prepare to hand over the UE to the target base station in step 754.

In other implementations, the serving base station may receive an indication from the current Anchor base station that the UE needs to STAY with the current Anchor base station 756. Accordingly, the serving base station may cancel the IHO state and wait for a handover initiation from the Anchor base station 758.

In some aspects of implementation, the network may override the HO or STAY request from the UE based on the availability of the radio resources at the candidate cell or for any other reason. When no indication of state transition is received, the serving cell remains in Non-Anchor status 740 and can repeat the above procedures of the serving cell as Non-Anchor cell during IHO 725.

Figure 8:
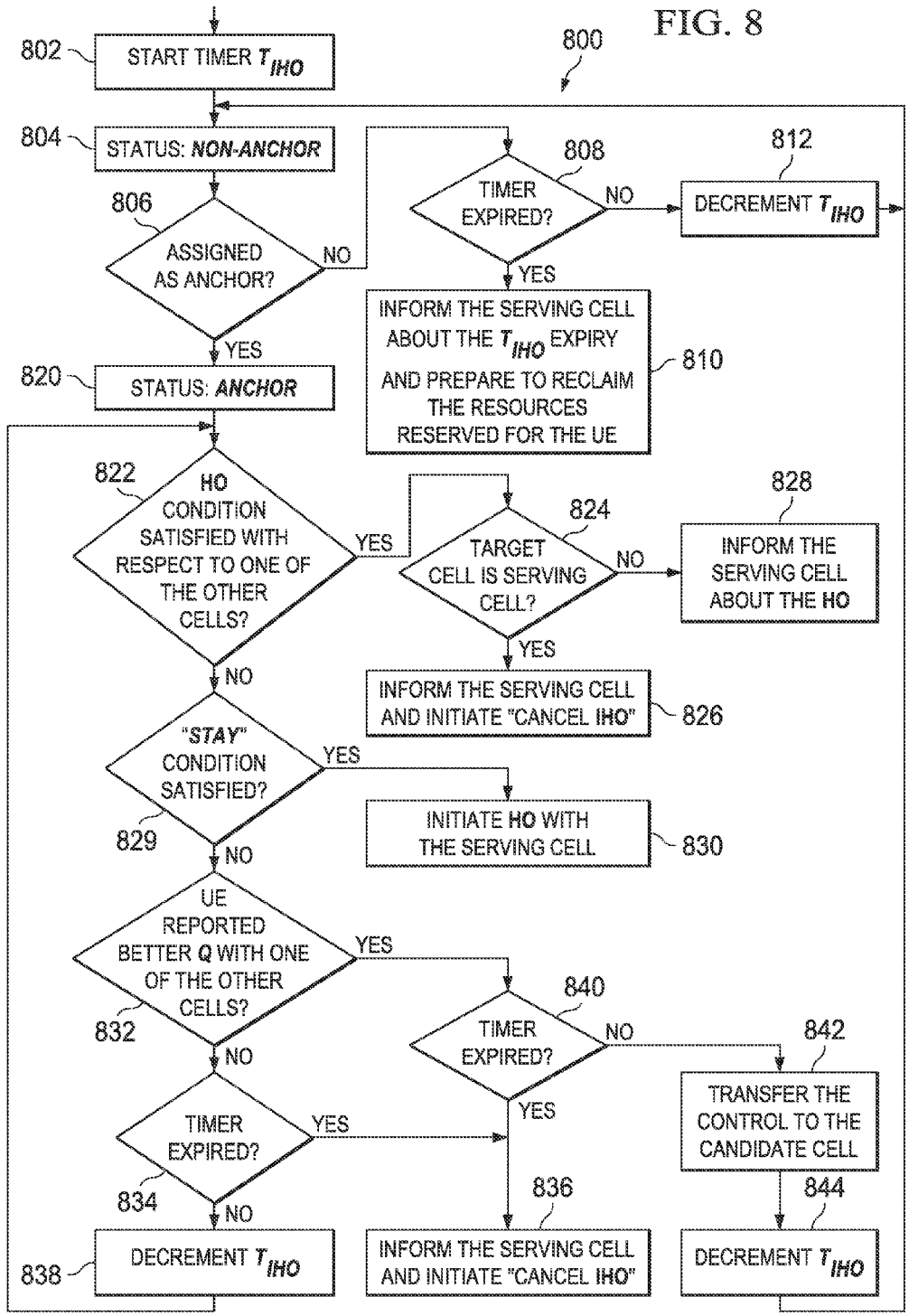
FIG. 8 is a flow chart illustrating an example method may be performed by a candidate cell in a handover mechanism.

FIG. 8 is a flow chart 800 illustrating an example method may be performed by a candidate cell in a handover mechanism. The candidate cell may first receive an indication from a serving cell of a UE that an IHO state has been initialized. When a candidate cell participates in the IHO state, it may first start an IHO timer in step 802. In the beginning, it may be in Non-Anchor status 804 and wait for anchor assignment in step 806. If no transfer of Anchor control from a current anchor cell is received, the candidate cell may proceed to check if the IHO time is expired 808. Upon the expiry of the IHO timer, the candidate cell can inform the serving cell that the time limit for this IHO state is reached and prepare to reclaim the resources reserved for the UE in the step 810. If the IHO timer is running 808, the candidate cell can decrement the IHO timer 812 and go back to step 804 remaining in Non-Anchor status.

If the IHO candidate cell receives an indication from a current anchor base station that the IHO candidate base station can have anchor functionality for the UE in step 806, it can enter Anchor status 820 and have anchor control. As an anchor cell, the candidate cell may allocate DL resource, grant UL resource for the UE, and actively communicate with the UE. Similar to the procedures of a serving cell in an Anchor status as illustrated in FIG. 7, the candidate cell may determine if any state transition of the UE is needed. During the IHO state, the decision of HO or HO cancellation (STAY) can be UE controlled or network controlled.

In some embodiments, a "HO" condition may be satisfied with respect to a target base station in step 822. The target base station can be the serving base station of the UE, another candidate base station, or a non-candidate base station. If the target base station is the serving base station at step 824, the candidate base station can inform the serving base station that the target base station is the serving base station and cancel the IHO state in step 826. When the target base station is not the serving base station, then the candidate base station may inform the serving base station that the UE needs to be handed over to the target cell 828. Then the serving base station may communicate with the target base station for handover procedures.

In some embodiments, the candidate cell may satisfy a "STAY" condition 829, which means the UE can be handed over to the candidate base station that is the current anchor base station. In this case, the candidate base station may send a handover initiation to the serving base station of the UE in step 830. The candidate base station and the serving base station may collaborate in the handover procedures.

In some implementations, neither the "HO" condition in step 822 nor the "STAY" condition in step 829 is satisfied. The candidate cell, as the Anchor cell, can check the quality measurements reported from the UE in step 832, and further proceeds to step 834 or step 840 to check if the IHO timer is expired or not. Given the expiry of the IHO timer, the candidate cell may inform the serving cell that the expiry of IHO state, cancel the IHO state, and reclaim the resources reserved for the UE in step 836. If the IHO timer is still running 834 and no other cell is expected to have better signal quality than the candidate cell 832, the candidate cell may decrement the timer 838, remain in the Anchor status 820, and repeat the above mentioned process from step 822. When the IHO timer is still running 840 and there is another candidate cell has better signal quality than the current anchor cell 832, the anchor cell may transfer Anchor control to the candidate cell 842. After decrementing the IHO timer 844, the candidate cell may exit from the Anchor status and go to Non-Anchor status 804.

Figure 9A:
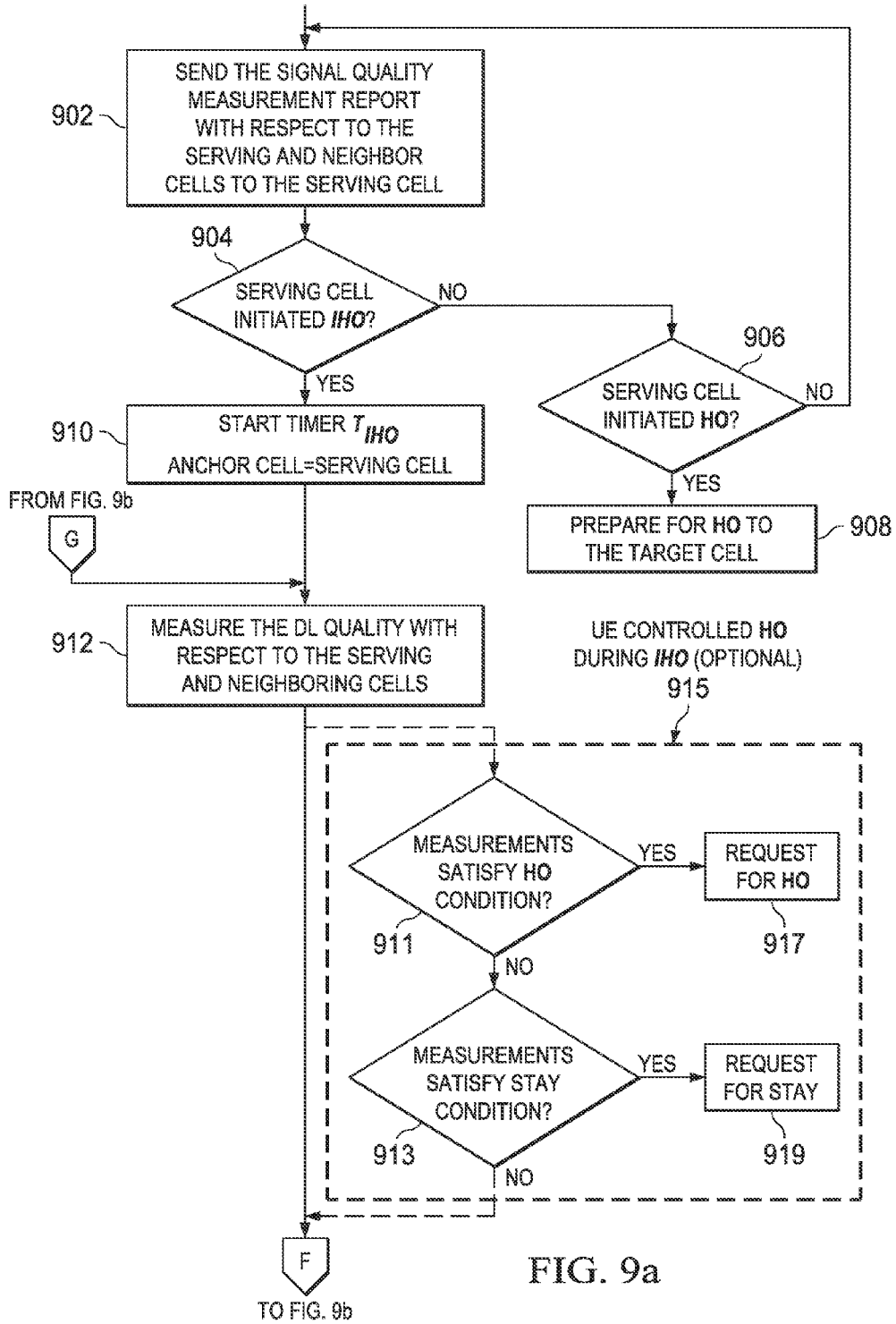
FIG. 9 is a flow chart illustrating an example method may be performed by a UE in a handover mechanism.
Figure 9B:
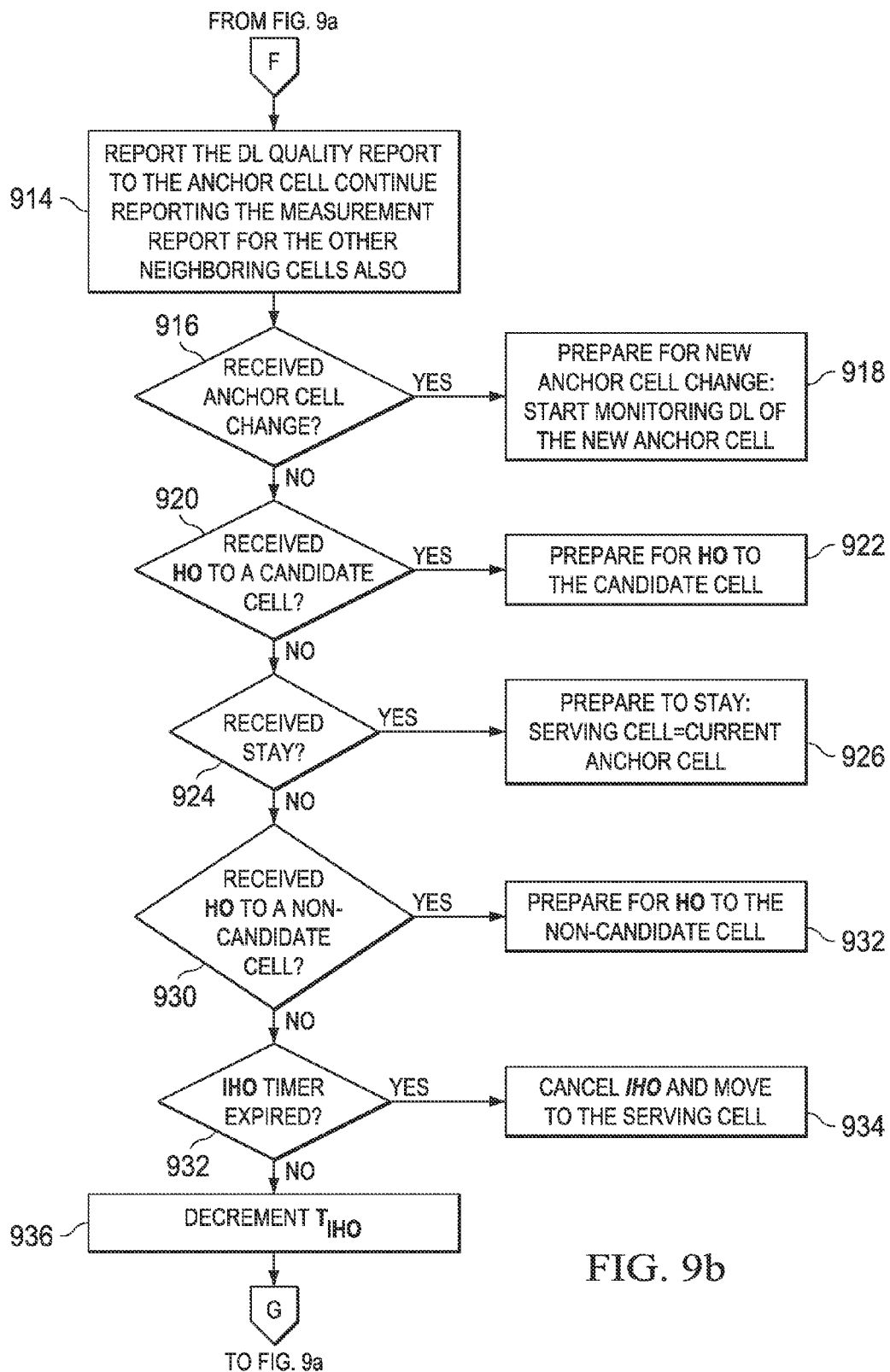

FIG. 9 is a flow chart 900 illustrating an example method may be performed by a UE in a handover mechanism with IHO state. The UE can first measure DL signal quality with respect to its serving cell and neighboring cells and send the corresponding measurement reports to the serving cell in step 902. The measurement report sent by the UE can include the receive signal quality with respect to the serving base station and at least one other neighbor base station, wherein the receive signal quality comprised at least one of the following: reference signal receive quality, reference signal receive power, signal to interference plus noise ratio, or average packet delay.

The UE can listen to the control channel to see if the serving cell initiates an IHO state 904 or a HO state 906. If the serving cell indicates that the UE may hand over to a target cell in step 906, for example, by sending a HO initiation message, the UE can then prepare corresponding handover procedures with respect to the target cell in step 908. In some implementations, the serving cell may indicate the UE to enter the IHO state in step 904 by sending an IHO initiation message. The message can include one or more of, for example, an IHO timer value, a list of IHO candidate base stations, a descriptor of a handover algorithm, or representative parameter values of a handover algorithm (such as a promised QoS that the network promises to the UE and various QoS thresholds). Upon receipt of the IHO initiation message, the UE can start an IHO timer in step 910. The UE may determine an anchor base station of the IHO state. In the illustrated case shown in FIG. 9, the UE enters the IHO state in step 910 and continues the active communications with the serving cell because the serving cell is the default anchor cell during the initiation of the IHO state. The UE may continue to measure the DL signal quality with respect to the serving cell and neighboring cells in step 912 and report the signal quality to the anchor cell in step 914. In some implementations, the UE can initiate the IHO state by acquiring DL and UL synchronization with respect to the candidate base stations. In some implementations, the UE can initiate the IHO state by acquiring system information parameters of the candidate base stations.

If no request for HO or IHO state is received from the serving cell at step 904, the UE may go back to step 902 and continue to measure signal quality and report the signal quality to the serving cell.

With the measured signal quality, the UE can optionally perform some algorithm 915 to determine whether to exit the IHO state by handing over to one of the neighboring cells, or by staying with the serving cell. This process can correspond to the UE-controlled scenarios described above. Specifically, the UE can evaluate the measured signal quality with respect to all neighboring cells to check if a HO condition or a STAY condition is satisfied in decisional steps 911 and 913, respectively. Given the HO condition satisfied with one of the neighboring cells, the UE can then send a request to the serving cell to initiate a handover to the neighboring cell 917. In some other scenarios, the STAY condition may be satisfied, for example, when the serving cell is expected to have a superior signal quality than the other cells. Then the UE may request to stay with the serving cell and cancel the IHO state 919. If neither the HO condition nor the STAY condition is satisfied, the UE may remain in IHO state with the serving cell as the anchor cell, and proceed to the step 914.

During the IHO state, the UE may receive a notification from the current anchor base station (a first anchor base station) that the anchor base station is changed to a new base station (a second anchor base station) in step 916. In this case, the UE may receive radio resource assignment and grant from the second anchor base station to establish resource access and synchronization to the second anchor base station; and start transmitting/receiving data packets to/from the second anchor base station. It may also start monitoring the DL signal quality with respect to the second anchor base station 918.

In some implementations, the UE may receive from the anchor cell a handover request to a target cell. The target cell can be an IHO candidate cell 920, or a non-candidate cell 930. The UE can then prepare corresponding procedures for handover to the IHO candidate cell and the non-candidate cell in steps 922 and 932, respectively.

In some other implementations, the UE may receive from an indication to STAY with the current anchor cell 924. In cases that the serving cell is the current anchor cell, the UE may cancel IHO state and stay with the serving cell 926.

If no above state change request is received, the UE can check the IHO timer 932. If the timer is expired, the UE may cancel the IHO state and stay with the serving cell 934. If the timing is still running, the UE may decrement the timer 936 and go back to the step 912 continuing signal quality measurement and report.

The UE steps 920-936 are illustrated with an embodiment that the anchor cell is the serving cell in FIG. 9. In fact, these steps can be applied to scenarios where the anchor cell is not the serving cell with a few modifications. For example, when the UE receives a STAY request from the current anchor cell that is not the serving cell, the UE may prepare handover from the serving cell to the current anchor cell and cancel the IHO state.

Figure 10:
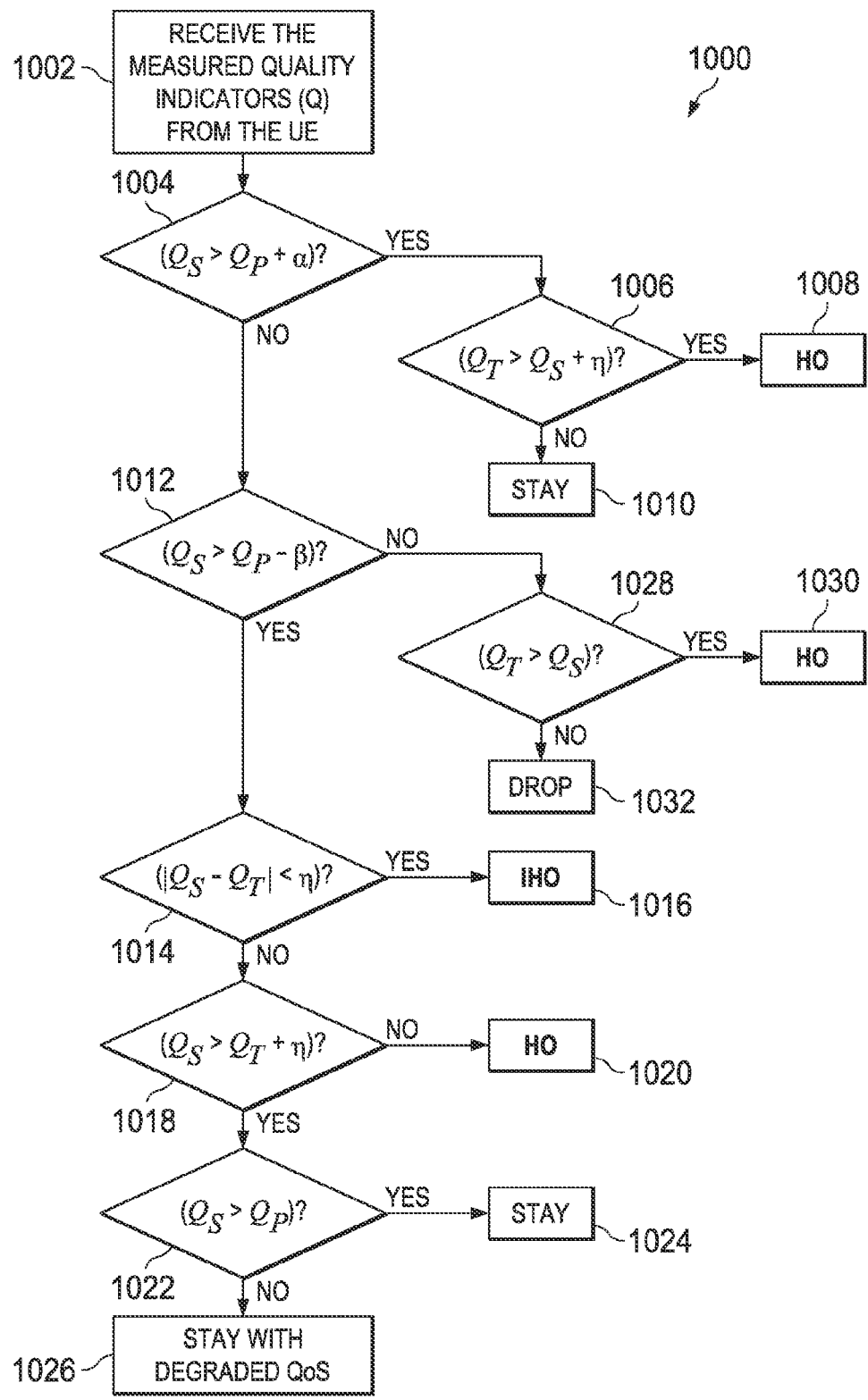
FIG. 10 is a schematic flow diagram illustrating an example handover algorithm with the IHO state.

FIG. 10 is a flow chart 1000 illustrating an example handover algorithm with an IHO state. The algorithm can be performed, for example, by a serving base station of a UE. In this example algorithm, $Q_S$ and $Q_T$ represent QoS measurements measured by the UE with respect to the serving cell and a target cell respectively. $Q_P$ represents the QoS that the network promises to the UE. $\alpha$, $\beta$ and $\eta$ are implementation specific thresholds which share the same unit of the quality indicators and can be set by operators to optimize the HO performance. The QoS measurement may be averaged over a suitable time period. The QoS measurements can also be referred as signal quality indicators. These measurements such as $Q_S$, $Q_P$, and $Q_T$, as well as the threshold such as $\alpha$, $\beta$ and $\eta$ have associated values that representative of the quality of the channel, signal, etc. These values can be used for quantitative comparisons between each other.

As mentioned above, there can be associated conditions for HO, IHO and STAY states. The conditions can be defined based on the signal quality indicators with some predetermined thresholds. The example HO algorithm below will provide more details on some conditions of HO, IHO, and STAY states. Other conditions for HO, IHO and STAY states can also be defined without departing from the scope of this disclosure.

When the base station received the QoS measurement or Quality indicator (Q) from the UE at step 1002, the base station can first check, in step 1004, whether the expected QoS of the serving cell $Q_S$ is greater than the promised QoS value $Q_P$ by a factor α. If so, the base station may proceed further to step 1006 to compare the QoS of the target cell with the Qos of the serving cell. If the QoS of the target cell is even better than the Qos of the serving cell by a factor η, the QoS of the target cell is well beyond the promised QoS to the UE. The base station may decide to perform handover to the target cell for better QoS expected by the target cell for the UE 1008. In some implementations, if the QoS of the target cell is not larger than $(Q_S+\eta)$, the base station may restrict handover and stay with the current serving cell 1010.

In some implementations, the QoS with respect to the serving cell may not exceed the promised QoS by a factor α at step 1004, the base station can move to step 1012 to determine if the QoS of the serving cell is above than the promised QoS less/3. If the QoS of the serving cell satisfies $Q_P-\beta<Q_S \leq Q_P+\alpha$ and the QoS difference between the serving cell and the target cell is below a threshold η (step 1014), the IHO state 1016 may be triggered to reduce unnecessary handovers. On the other hand, given $Q_P-\beta<Q_S \leq Q_P+\alpha$ but the QoS difference between the serving cell and the target cell is larger than the threshold η (step 1014), the base station may proceed to step 1018 to determine which one has a larger value between the $Q_S$ and the $Q_T$. If $Q_T$ is above $Q_S$ by η at the decisional step 1018, the QoS with respect to the target cell is better than the QoS associated with the serving cell to the extent such that a handover to the target cell is triggered 1020. In some implementations, if $Q_S$ is above $Q_T$ by η, the UE may stay with the serving cell and proceed to step 1022 in determining if $Q_S$ has a value larger than the promised QoS $Q_P$. If so, the serving cell can provide a promised QoS to the UE where the UE is in STAY state with the serving cell 1024. However, if $Q_S$ is below $Q_P$ 1022, the UE may have to stay with the serving cell with degraded QoS 1026 where no candidate cells expect a better QoS than $Q_S$ in this case.

In some implementations, the serving base station may decide that the expected QoS associated with the serving cell is less than $(Q_P-\beta)$ at step 1012. Under such a scenario, the serving base station may conduct a handover 1030 if the QoS of the target cell is better than that of the serving cell 1028. Otherwise, the serving base station may drop the UE in step 1032 given that the promised QoS cannot be guaranteed by either the serving cell or the target cell 1028.

The above example algorithm may be evaluated by the serving base station with respect to all the neighboring cells. In some implementations, the above algorithm can be evaluated, at least in part, by a UE. For example, in a UE-controlled scenario, during an IHO state, the UE can follow the steps 1018-1026 of the algorithm in FIG. 10 to determine if a HO condition or a STAY condition is satisfied. Because the UE has the signal quality measurements, the UE can make the decision and inform the decision to the anchor cell, without sending signal measurements to the anchor base stations. In this way, signaling overhead can be reduced.

Figure 11:
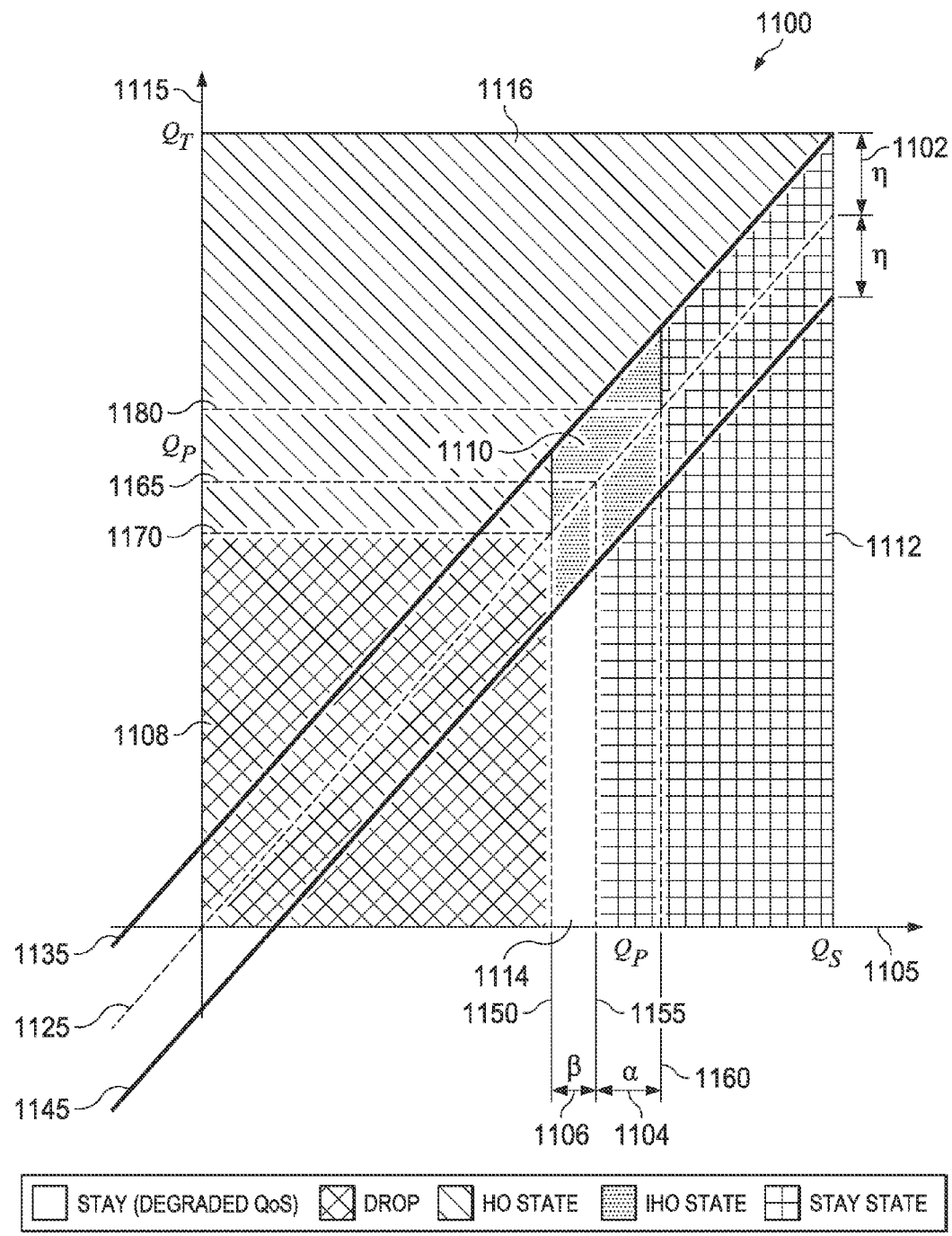
FIG. 11 is a schematic plot illustrating different state regions with respect to different signal quality of the serving cell and a target cell.

FIG. 11 is a schematic plot 1100 illustrating different state regions with respect to different signal quality of the serving cell and a target cell. The plot is based on the algorithm described above in FIG. 10. In this example, only one target cell is considered. If more than one target cells are considered, a multi-dimensional figure can be expected. As shown in FIG. 11, the horizontal axis 1105 is $Q_S$, the QoS with respect to the serving cell, while the vertical axis 1115 is $Q_T$, the QoS with respect to the target cell. A 45-degree dashed line 1125 corresponds to the points that $Q_S$ and $Q_T$ are equal. Region above the line 1125 is where the QoS of the target cell is better than the QoS of the serving cell whereas the area below the line 1125 represents the case where the QoS of the target cell is worse than the QoS of the serving cell. Between the two parallel lines 1135 and 1145, the difference between $Q_S$ and $Q_T$ is within the threshold η 1102. The promised QoS $Q_P$ is shown as lines 1155 and 1165 with respective to $Q_T$ and $Q_S$, respectively. Similarly, lines 1150 and 1170 correspond to $Q_P-\beta$ with respect to $Q_S$ and $Q_T$; lines 1160 and 1180 correspond to $Q_P+\alpha$ with respect to $Q_S$ and $Q_T$, respectively. Parameters α 1104, β 1106, and η 1102, collaborate with the promised QoS $Q_P$ in determining different handover regions, such as Drop region 1108, IHO state region 1110, Stay region 1112, Stay with degraded QoS region 1114 and HO state region 1116. In particular, the IHO state can occur in region 1110 where the QoSs of the serving cell and the target cell are around the promised QoS $Q_P$. Applying IHO state in this region can reduce unnecessary handovers because $Q_S$ and $Q_T$ do not differ too much (the difference is within η); potential QoS gain (from a slightly higher $Q_T$) of applying a complete handover might be outweighed by QoS degradation due to overhead, delay, data interruption of the handover procedure. Preferably, applying the IHO state in this case can restrict handover and avoid unnecessary data interruptions. During the IHO state, the UE can obtain better QoS by receiving data packets from either the serving cell or the target cell. In other words, UE obtains advantage of switched diversity receipt. While some degradation is expected because of the slowness of the switching process, the trade-off is that the handoff procedure is restricted and therefore the likelihood of the negative effects of frequent handoff (such as dropped calls) is minimized. The resource sharing between the serving and the target cell, if properly managed, can also result in better overall spectral efficiency.

The parameters α 1104, β 1106, and η 1102 can be configurable and implementation specific. The method and algorithm mentioned above enable the network operators to design these parameters to optimize the handover performance depending on different deployment scenarios.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Variations, modifications, and enhancements to the described examples and implementations and other implementations can be made based on what is disclosed.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method performed at a serving base station of a wireless communications network, the serving base station serving a user equipment (UE) the method comprising:
   receiving a first downlink (DL) signal quality indicator from the UE, the first DL signal quality indicator indicating that the UE is proximate to a plurality of neighboring base stations and can receive data packets from at least one of the plurality of the neighboring base stations;
   determining, based on the first DL signal quality indicator, that a condition for an intermediate handover (IHO) state is satisfied, wherein the determining comprises:
      determining a first signal quality between the UE and the serving base station;
      determining a second signal quality between the UE and at least one of the plurality of the neighboring base stations;
      determining that a difference between the first and the second signal qualities is below a predefined threshold; and
      in response to determining that the difference between the first and the second signal qualities is below the predefined threshold, determining that the condition for the IHO state is satisfied;
   responsive to the determining that the condition for the IHO state is satisfied, initiating the IHO state;
   receiving from the UE, while in the IHO state, a second DL signal quality indicator;
   determining, while in the IHO state and based on the second DL signal quality indicator, whether a criteria for a handover state or a criteria for a stay state is satisfied;
   if the criteria for the handover state is satisfied, initiating the handover state and exiting the IHO state;
   if the criteria for the stay state is satisfied, initiating the stay state and existing the IHO state; and
   if neither the criteria for the handover state or the criteria for the stay state is satisfied:
      determining, while in the IHO state, if a condition for transferring anchor base station functionality from the serving base station to another neighboring base station is satisfied, and
      if the condition for transferring the anchor base station functionality from the serving base station to the another neighboring base station is satisfied, transferring the anchor base station functionality to the another neighboring base station.

2. The method of claim 1, wherein the first DL signal quality indicator comprises at least one of the following: reference signal receive quality, reference signal receive power, signal to interference plus noise ratio, or average packet delay.

3. The method of claim 1, further comprising:
   selecting one or more neighboring base station from the plurality of neighboring base stations when the first DL signal quality indicator received from the UE is above a first predefined threshold;
   sending an IHO request message to the one or more neighboring base stations;
   receiving an IHO response from the one or more neighboring base stations; and
   evaluating the IHO response to determine one or more IHO candidate base stations.

4. The method of claim 3, wherein the first predefined threshold is a UE specific parameter and selected to satisfy a promised Quality of Service (QoS) to the UE.

5. The method of claim 3, wherein evaluating the IHO responses comprises;
   selecting a neighboring base station as a potential IHO candidate base station when the neighboring base station responds positively to the IHO request;
   choosing the IHO candidate base stations when the number of potential IHO candidate base stations is above a maximum number, N, of allowed IHO candidate base stations; and
   sending IHO cancellation messages to neighboring base stations which accepted the IHO request but are not included in the subset of IHO candidate base stations.

6. The method of claim 5, wherein choosing the IHO candidate base stations comprises:
   ordering the IHO candidate base stations in decreasing order based on DL signal quality indicators;
   selecting the IHO candidate base stations starting from the first in the order list and up to the maximum allowed IHO candidate base stations.

7. The method of claim 5, wherein the maximum number of IHO candidate base stations, N, is a network configuration dependent parameter.

8. The method of claim 5, wherein choosing the IHO candidate base stations comprises selecting N base stations having a highest signal quality indicator.

9. The method of claim 3, further comprising:
   starting an IHO timer;
   sending an IHO initiation message to the UE initiating an IHO state; and
   transmitting data to the UE.

10. The method of claim 9, wherein the value of the IHO timer is included in the IHO initiation message to the UE.

11. The method of claim 10, wherein the value of IHO timer is included in the IHO request message to the neighboring base stations.

12. The method of claim 9, wherein the serving base station is a default anchor base station after the IHO state is initiated, the anchor base station in IHO state is configured to:
   assign DL resources and grant Uplink (UL) resources to the UE; and
   send data packets to the UE or receive data packets from the UE.

13. The method of claim 1,
   wherein the condition for transferring anchor base station functionality includes when DL signal quality from the another neighboring base station is better than DL signal quality from the serving base station.

14. The method of claim 1, wherein the criteria for the handover state comprises DL signal quality from the serving base station being inferior to DL signal quality from a neighboring base stations by a predefined threshold.

15. The method of claim 1, wherein the criteria for the stay state comprises DL signal quality from a neighboring base station being inferior to DL signal quality from the serving base station by a first predefined threshold.

16. The method of claim 3, further comprising, during the IHO state, initiating a handover to a non-IHO candidate base station when DL signal quality from the non-IHO candidate base station and the serving base station meet the criteria for the handover state.

17. The method of claim 16, wherein the criteria for the handover state comprises:
DL signal quality from the serving base station is inferior to DL signal quality from the non-IHO candidate base station by a second predefined threshold.

18. The method of claim 1, further comprising, if the condition for the IHO state is satisfied, initializing a timer associated with the IHO state.

19. The method of claim 18, further comprising cancelling the IHO state at the expiration of the IHO state timer.

20. The method of claim 1, wherein the IHO state initiation is transparent to the wireless communications network.

21. The method of claim 1, wherein the first DL signal quality indicator comprises an indication of signal quality between the UE and at least one of the plurality of the neighboring base stations.

22. The method of claim 3, wherein in the IHO state, the method further comprises transmitting data packets destined for the UE to at least one of the one or more IHO candidate base stations over a backhaul communications link.

23. The method of claim 22, wherein the data packets are PDCP packets.

24. The method of claim 3, wherein in the IHO state, the method further comprises transmitting one or both of a radio resource control message or a non-access stratum (NAS) message to at least one of the one or more IHO candidate base stations.

25. The method of claim 1, wherein determining whether the condition for the IHO state is satisfied comprises receiving an acknowledgement signal from the UE.

26. The method of claim 3, further comprising, in the IHO state:
receiving a request from the UE to stay with the serving base station; and
sending IHO cancellation message to the one or more IHO candidate base stations.

27. The method of claim 3, further comprising, in the IHO state:
receiving a DL signal quality indicator indicates that signal quality between the UE and at least one of the one or more IHO candidate base station is better than signal quality between the UE and the serving base station; and
transferring control of communications for the UE to the at least one of the one or more IHO candidate base stations.

28. The method of claim 27, further comprising:
receiving control of communications for the UE from the at least one of the one or more IHO candidate base stations.

29. The method of claim 27, further comprising:
receiving a message of handover from the at least one of the one or more IHO candidate base stations, the at least one of the one or more IHO candidate base stations acting as an anchor base station for the UE; and
cancelling the intermediate handover state.

30. The method of claim 29, wherein the message indicates a handover to another base station.

31. The method of claim 29, wherein the message indicates the UE to stay with the anchor base station.

32. A base station of a wireless communications network, the base station serving a user equipment (UE), the base station configured to:
receive a first downlink (DL) signal quality indicator from the UE, the first DL signal quality indicator indicating that the UE is proximate to a plurality of neighboring base stations and can receive data packets from at least one of the plurality of the neighboring base stations;
determine, based on the first signal quality indicator, that a condition for an intermediate handover (IHO) state is satisfied, wherein the determining comprises:
determining a first signal quality between the UE and the serving base station;
determining a second signal quality between the UE and at least one of the plurality of the neighboring base station;
determining that a difference between the first and the second signal qualities is below a predefined threshold; and
in response to determining that the difference between the first and the second signal qualities is below the predefined threshold, determining that the condition for the IHO state is satisfied;
responsive to the determination that the condition for the IHO state is satisfied, initiate the IHO state;
receive from the UE, while in the IHO state, a second DL signal quality indicator;
determine, while in the IHO state and based on the second DL signal quality indicator, whether a criteria for a handover state or a criteria for a stay state is satisfied;
if the criteria for the handover state is satisfied, initiate the handover state and exit the IHO state;
if the criteria for the stay state is satisfied, initiate the stay state and exist the IHO state; and
if neither the criteria for the handover state or the criteria for the stay state is satisfied:
determine, while in the IHO state, if a condition for transferring anchor base station functionality from the serving base station to another neighboring base station is satisfied, and
if the condition for transferring the anchor base station functionality from the serving base station to the another neighboring base station is satisfied, transfer the anchor base station functionality to the another neighboring base station.

* * * * *

UNITED STATES PATENT AND TRADEMARK OFFICE
CERTIFICATE OF CORRECTION

PATENT NO. : 9,503,935 B2  
APPLICATION NO. : 13/752054  
DATED : November 22, 2016  
INVENTOR(S) : Bontu et al.

Page 1 of 1

It is certified that error appears in the above-identified patent and that said Letters Patent is hereby corrected as shown below:

In the Claims

In Column 26, Line 52, In Claim 11, delete "10," and insert -- 9, --, therefor.

In Column 26, Line 52, In Claim 11, delete "value of" and insert -- value of the --, therefor.

Signed and Sealed this
Twenty-first Day of February, 2017

Michelle K. Lee
*Director of the United States Patent and Trademark Office*